(12) United States Patent
Yamada et al.

(10) Patent No.: US 7,668,392 B2
(45) Date of Patent: Feb. 23, 2010

(54) BLOCK NOISE DETECTING AND REDUCING METHOD AND APPARATUS, USING COMPARISON OF ADJACENT PIXEL BOUNDARY DIFFERENCES WITH PREDICTED PIXEL BOUNDARY DIFFERENCES

(75) Inventors: Kohji Yamada, Kawasaki (JP); Shohei Nakagata, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 468 days.

(21) Appl. No.: 11/496,501

(22) Filed: Aug. 1, 2006

(65) Prior Publication Data

US 2007/0223835 A1 Sep. 27, 2007

(30) Foreign Application Priority Data

Mar. 27, 2006 (JP) ............................. 2006-085334

(51) Int. Cl.
*G06K 9/40* (2006.01)
(52) U.S. Cl. ...................................... 382/268
(58) Field of Classification Search ................ 382/268, 382/286, 263, 266, 190–195, 254–275, 300; 375/E7.006–E7.208, 240–240.29; 348/14.13–14.15
See application file for complete search history.

(56) References Cited

U.S. PATENT DOCUMENTS 6,496,605 B1 * 12/2002 Osa ............................ 382/268

6,907,079 B2 * 6/2005 Gomila et al. ......... 375/240.25

FOREIGN PATENT DOCUMENTS

| JP | 8-205157 | 8/1996 |
|---|---|---|
| JP | 2000-350202 | 12/2000 |
| JP | 2001-119695 | 4/2001 |
| JP | 2005-12641 | 1/2005 |
| WO | WO 97/39572 | * 10/1997 |

OTHER PUBLICATIONS

Shen et al., Artifact Reduction for JPEG-Compressed Images with VQ and Linear Estimation, Multimedia Signal Processing, IEEE, 1997, pp. 157-162.*

* cited by examiner

*Primary Examiner*—Andrew W Johns
*Assistant Examiner*—Thomas A Conway
(74) *Attorney, Agent, or Firm*—Staas & Halsey LLP

(57) ABSTRACT

A pixel boundary difference detector detects a pixel boundary difference across a pixel boundary on the basis of a difference value between pixel values of adjacent pixels across the pixel boundary on a picture plane of an input image frame, and a predicted pixel value on the pixel boundary predicted from at least a plurality of pixels on one side of the pixel boundary, an accumulator accumulates the pixel boundary differences for one image frame, and a block noise detector detects a block noise on the basis of a result of the accumulation. The accuracy of block noise detection is improved, the effect of block noise reduction is improved, and the picture quality is improved.

29 Claims, 26 Drawing Sheets

CASE OF PIXEL BORDER DIFFERENCE BEING A

CASE OF PIXEL BOUNDARY DIFFERENCE BEING B

CASE OF PIXEL BOUNDARY DIFFERENCE BEING
INVOLVED IN ACCUMULATING CALCULATION

CASE OF PIXEL BOUNDARY DIFFERENCE BEING
NOT INVOLVED IN ACCUMULATING CALCULATION

IN CASE OF PIXEL BOUNDARY DIFFERENCE BEING A

IN CASE OF PIXEL BOUNDARY DIFFERENCE BEING B

BLOCK NOISE DETECTING AND REDUCING METHOD AND APPARATUS, USING COMPARISON OF ADJACENT PIXEL BOUNDARY DIFFERENCES WITH PREDICTED PIXEL BOUNDARY DIFFERENCES

CROSS REFERENCE TO RELATED APPLICATIONS

This application is based on and hereby claims priority to Japanese Application No. 2006-85334 filed on Mar. 27, 2006 in Japan, the contents of which are hereby incorporated by reference.

BACKGROUND OF THE INVENTION (1) Field of the Invention

The present invention relates to a block noise detecting method and apparatus, and a block noise reducing method and apparatus. More specifically, the present invention relates to a method and apparatus for detecting a size, position and intensity of a block noise, and a method and apparatus for reducing the block noise on the basis of a result of the detection.

(2) Description of Related Art

Beginning of spread of digital broadcasting, DVD players, disk recorders and so forth to which the digital image compression coding technique is applied gives us more opportunity to view compression-coded pictures. As this, compression-coded pictures are getting closer to us.

MPEG-2, which is International Standard for image compression used in digital broadcasting, disk recorders and so forth, realizes image compression in the domain of time with motion compensation which refers an analogous portion between picture frames. Therefore, the difficulty of the compression changes according to the contents of the picture. When the difficulty of image compression is great because there is little analogous portion between image frames (hereinafter, referred to simply "frame"), the image data is encoded at high compression ratio. This causes loss of high frequency components of the picture, which causes loss of the continuity of pixel values in the vicinity of the border of blocks, leading to a rectangular noise, that is, a block noise, on the restored picture.

As known techniques for detecting and reducing such block noises, there are techniques proposed in the following Patent Documents 1 to 4.

(1) The technique disclosed in Patent Document 1 is aimed to accurately detect a block noise even when a decoder does not output a signal indicating the boundary of pixel blocks. For this purpose, an input video signal is differentiated to detect a solitary differentiation point (impulse-shaped pulse) in the differentiated signal, a result of the detection is integrated in cycles of pixel blocks by an integrating circuit, information on the solitary differentiation points generated in cycles of the pixel blocks is accumulated, and presence or absence of a block noise is determined in each frame on the basis of the output of the integrating circuit. Accordingly, even when the border of the pixel blocks is vague, it is possible to accurately determine presence or absence of a block noise. Additionally, by performing the integrating process in the horizontal and the vertical directions, it becomes possible to appropriately detect an impulse-shaped pulse correlating in the horizontal and the vertical directions, which has generated due to a block noise. This allows accurate determination on presence or absence of a block noise.

The technique disclosed in Patent Document 2 is aimed to provide a block noise reducing apparatus having a simple constitution. For this purpose, an input video signal is differentiated to obtain solitary differentiation data at a solitary differentiation point, the solitary differentiation data is filtered to obtain correction data for correcting a difference in signal level across a border between a rectangular block in which a block noise is generated and the adjacent block, and the correction data is added to the input video signal delayed by a predetermined time. Whereby, it is possible to get rid of a large difference across the border between blocks with the use of the correction data, and allow a block noise reducing apparatus to have a simple constitution.

(3) The technique disclosed in Patent Document 3 is aimed to high-accurately detect a block noise, which is prone to be generated in compressed video, from only pixel data without encoding information, and remove the block noise. For this purpose, a weighting process using features of a block noise is performed on spatial differences of video input signals, results of the weighting process are accumulated in the spatial direction to detect a block noise, and an additional cumulative process in a spatial direction, which is a different direction, is performed on results of the detection. Whereby, it is possible to avoid erroneous detection due to an effect of a random noise, which is prone to be generated when a block noise is detected, from only pixel data.

(4) The technique disclosed in Patent Document 4 is aimed to obtain a restored picture of high picture quality by effectively removing only noise components from compression-coded picture signals. For this purpose, restored picture signals are divided into predetermined unit blocks, whether or not the pixel level within a divided unit block is fluctuated is detected, a difference value between adjacent pixels in a unit block in which no fluctuation in level is detected and the adjacent block is determined, the difference value is compared with a predetermined threshold value to determine whether or not a block noise is generated, and a smoothing process is performed on adjacent unit blocks in which the difference value is less than the threshold value. Whereby, it is possible to avoid distortion of a displayed picture due to a block noise.

As shown in (1) of FIG. 25, for example, the techniques disclosed Patent Documents 1, 2 and 4, basically, obtain a difference (absolute value) between adjacent pixels within a frame as a difference across a pixel boundary for detecting a block noise, accumulate values (refer to reference numeral 101: detection signal=1) whose adjacent pixel difference absolute values are above a threshold value ["threshold value 1" in (1) of FIG. 25] in cycles of the block noise size as shown in (2) of FIG. 25 (in FIG. 25, the block noise size=8), and determine that a block noise is generated when the accumulated value of one frame is not less than a predetermined value [when not less than "threshold value 2" in (2) of FIG. 25] (refer to a portion enclosed by a broken line 102). Incidentally, the block noise size (block size) cycle is a cycle determined by a unit (a block size of 8×8 pixels, for example) in orthogonal transform process such as DCT transform or the like. A block noise size=8 signifies that 8×8 pixels are a unit block.

As shown in (1) of FIG. 26, the technique proposed in Patent Document 3 accumulates adjacent pixel difference absolute values which are not less than "threshold value 1" and not more than "threshold value 2" (refer to reference numeral 201: detection signal=1) in a frame in cycles of a block noise size (FIG. 26 shows an example where the block noise size=8), as shown in (2) of FIG. 26, and determines that a block noise is generated when the accumulated value of one frame is not less than a predetermined value (refer to a portion enclosed by a broken line 202).

As this, the known block noise detecting techniques obtain a difference (absolute value) between adjacent pixels as a basic amount used to detect a block noise, accumulate the values for one frame in the block noise cycles, and determine presence or absence of generation of a block noise on the basis of the magnitude of this accumulated value.

[Patent Document 1] Japanese Patent Application Laid-Open No. 2000-350202

[Patent Document 2] Japanese Patent Application Laid-Open No. 2001-119695

[Patent Document 3] Japanese Patent Application Laid-Open No. 2005-12641

[Patent Document 4] Japanese Patent Application Laid-Open No. HEI08-205157

However, there is a case where it is difficult to accurately detect a block noise from a difference value between adjacent pixels because it is usual that the difference value between the adjacent pixels is large in a portion where the picture (pixel) values are largely changed (the pixel boundary is inclined) although the block noise is not generated.

In addition, a value obtained by accumulating difference values between adjacent pixels in block noise cycles largely depends on contents of the picture, thus a value obtained by accumulating difference values between adjacent pixels in block size cycles is large in a complicated picture having a lot of high frequency components irrespective of presence or absence of generation of a block noise. This causes difficulty in finding accurately a block noise because it is difficult to discriminate between a case where a block noise is generated and a case where the picture is complicated.

SUMMARY OF THE INVENTION

In the light of the above drawbacks, an object of the present invention is to improve the accuracy of block noise detection, improve the effect of reducing block noises by using a result of the detection, and improve the restored picture quality.

To attain the above objects, the present invention provides the following block noise detecting method and apparatus, and block noise reducing method and apparatus. Namely, (1) The present invention provides a block noise detecting method comprising the steps of detecting a pixel boundary difference across a pixel boundary on the basis of a difference value between pixel values of adjacent pixels across the pixel boundary on a picture plane of an input image frame, and a predicted pixel value on the pixel boundary predicted from at least a plurality of pixels on one side of the pixel boundary, and accumulating the pixel boundary differences for one image frame to detect a block noise.

(2) It is preferable that the difference value between pixel values of the adjacent pixels is compared with a difference value between the predicted pixel value on the pixel boundary predicted from the plural pixels on one side of the pixel boundary and the predicted pixel value on the pixel boundary predicted from a plurality of pixels on the other side of the pixel boundary, and a smaller difference value is detected as a pixel boundary difference across the pixel border.

(3) The present invention further provides a block noise detecting apparatus comprising a pixel boundary difference detecting means for detecting a pixel boundary difference across a pixel boundary on the basis of a difference value between pixel values of adjacent pixels across the pixel boundary on picture plane of an input image frame, and a predicted pixel value on the pixel boundary predicted from at least a plurality of pixels on one side of the pixel boundary, an accumulating means for accumulating the pixel boundary differences for one image frame, and a block noise detecting means for detecting a block noise on the basis of a result of accumulation by the accumulating means.

(4) The present invention still further provides a block noise reducing method of performing a block noise reducing process on an input image frame on the basis of a result of block noise detection by the block noise detecting method described in (1) or (2).

(5) The present invention still further provides a block noise reducing apparatus comprising the block noise detecting apparatus described in (3), and a block noise reducing means for performing a block noise reducing process on the input picture frame on the basis of a result of detection by the block noise detecting apparatus.

The present invention provides at least, any one of the following effects and advantages.

(1) Since a pixel boundary difference across a pixel boundary is detected on the basis of a difference between pixel values of adjacent pixels across the pixel boundary and a predicted pixel value on the pixel boundary predicted from at least a plurality of pixels on one side of the pixel boundary, it is possible to consider the predicted pixel value on the pixel boundary when the pixel boundary difference is calculated. Even when the pixel boundary is inclined, it is possible to detect a more accurate pixel boundary difference, and improve the accuracy of block noise detection without using decoding information in compression coding such as quantization scale or the like.

(2) Predicted pixel values predicted from the both sides of the pixel boundaries can yield a more accurate pixel boundary difference, which more improves the accuracy of the block noise detection.

(3) When the predicted pixel value on the pixel boundary is predicted by linear prediction from plural pixels on one side of the pixel boundary, it is possible to improve the accuracy of the block noise detection with simple calculation and structure.

(4) When the pixel boundary difference is not less than a threshold value, this pixel boundary difference is excluded from the accumulating process for one picture frame when pixel boundary differences across a pixel boundary are accumulated. Since a difference larger than a difference caused by generation of a block noise is originated from the pattern of a picture, such difference is excluded from the accumulating process, which allows reduction of the effect of the pattern of a picture, and improves the block noise detection rate.

(5) Ratios each of which is a ratio of an accumulated value of pixel boundary differences across a pixel boundary to an accumulated value of pixel boundary differences across a pixel boundary separated by a half of the block noise size from the former pixel boundary are compared with one another. This can diminish the dependency of the block noise detection evaluation value on the complexity of the picture, reduce the effect of the pattern of a picture as compared with a case where a block noise is detected from an accumulated value of pixel boundary differences itself, which improves the accuracy of the block noise detection.

(6) The block noise generation intensity is determined on the basis of a ratio of the largest value of accumulated values of pixel boundary differences with the second largest value of the same. In this case, it is possible to reduce the effect of the pattern of a picture as compared with a case where a block noise is detected from an accumulated value of pixel boundary differences itself, which allows the accuracy of the block noise detection.

(7) When a difference between frames is small, the efficiency of the image compression with motion compensation is large. For this, when a difference between frames is smaller than a threshold value, the block noise detection conditions are controlled to be changed to conditions under which a block noise is difficult to be detected. By doing so, it is possible to diminish erroneous detection of a block noise when the picture has less motion and has a complicated pattern, which improves the accuracy of the block noise detection.

(8) When a block noise on a picture enlarged by a scale factor of an integral number after the picture is decoded, the pixel boundary differences are accumulated in a cycle of an integer multiple of the block noise. By doing so, it becomes possible to calculate the pixel boundary difference with only pixels not interpolated, which allows improvement of the accuracy of the block noise detection rate even in a picture on which the block noise is enlarged. In the case of a picture enlarged double, the pixel boundary difference is calculated with every two pixels, which can diminish the effect of the interpolating process of enlargement, and improve the accuracy of the block noise detection rate.

(9) Since the pixel boundary difference is prone to be affected by contents of the pattern of a picture, the accumulated value of pixel boundary differences for one frame used to determine block noise detection is fluctuated even when a block noise in almost the same degree is generated. Therefore, when the same block noise detection result is detected from a plurality of picture frames, this detection result is outputted, which can diminish the effect of the fluctuation in pixel boundary difference due to the pattern of a picture, and improve the accuracy of the block noise detection rate.

(10) By employing the above-mentioned block noise detecting technique in a block noise reducing apparatus, the accuracy of the block noise detection is improved. Accordingly, it is possible to make the block noise reducing process (filtering process) active only when required. As a result, it is also possible to reduce the generation rate of such phenomenon that the block noise is not reduced because the filtering process does not act although the block noise is generated, or that the picture is degraded because the filtering process acts although no block noise is generated, which allows improvement of the picture quality.

(11) The filtering intensity in the block noise reducing process is controlled on the basis of a ratio of an accumulated value of pixel boundary differences across a pixel boundary to an accumulated value of pixel boundary differences across a pixel boundary separated by a half of the block noise size from the former pixel boundary. By doing so, it is possible to make the filtering process for reducing the block noise active according to the block noise detection intensity, which allows improvement of the picture quality after the block noise reducing process.

(12) The filtering intensity in the block noise reducing process is controlling on the basis of a ratio of the largest value of accumulated values of pixel boundary differences to the second largest value of the same. By doing so, it is possible to make the filtering process for reducing a block noise active according to the block noise detection intensity, which improves the picture quality after the block noise reducing process.

(13) Loss of high frequency components due to high compression ratio causes a block noise because of loss of the continuity across the block boundary. For this, the filtering process for reducing a block noise not only reduces a block noise but also causes degradation of the picture quality such as blur of the picture. To cope with this drawback, the filtering process is applied on only a block noise boundary and vicinity thereof, whereby the discontinuity across the block boundary, which is a cause of a block noise, is reduced, and degradation of the picture in regions other than the block boundary is suppressed, which allows improvement of the picture quality after the block noise reducing process.

(14) A pixel boundary difference larger than a pixel boundary difference caused by a block noise is considered to be caused by a pattern of the picture. Accordingly, when a block noise is reduced by the filtering process, the filtering process is prevented from being active when the pixel boundary difference is larger than a threshold value. By doing so, it is possible to avoid degradation of the picture quality caused by that the filtering process is active on a difference originated from the nature of the picture, and improve the picture quality after the block noise reducing process.

DESCRIPTION OF THE PREFERRED EMBODIMENTS

Hereinafter, description will be made of embodiments of the present invention with reference to the drawings.

[A] Description of Block Noise Detecting Apparatus

Figure 1:
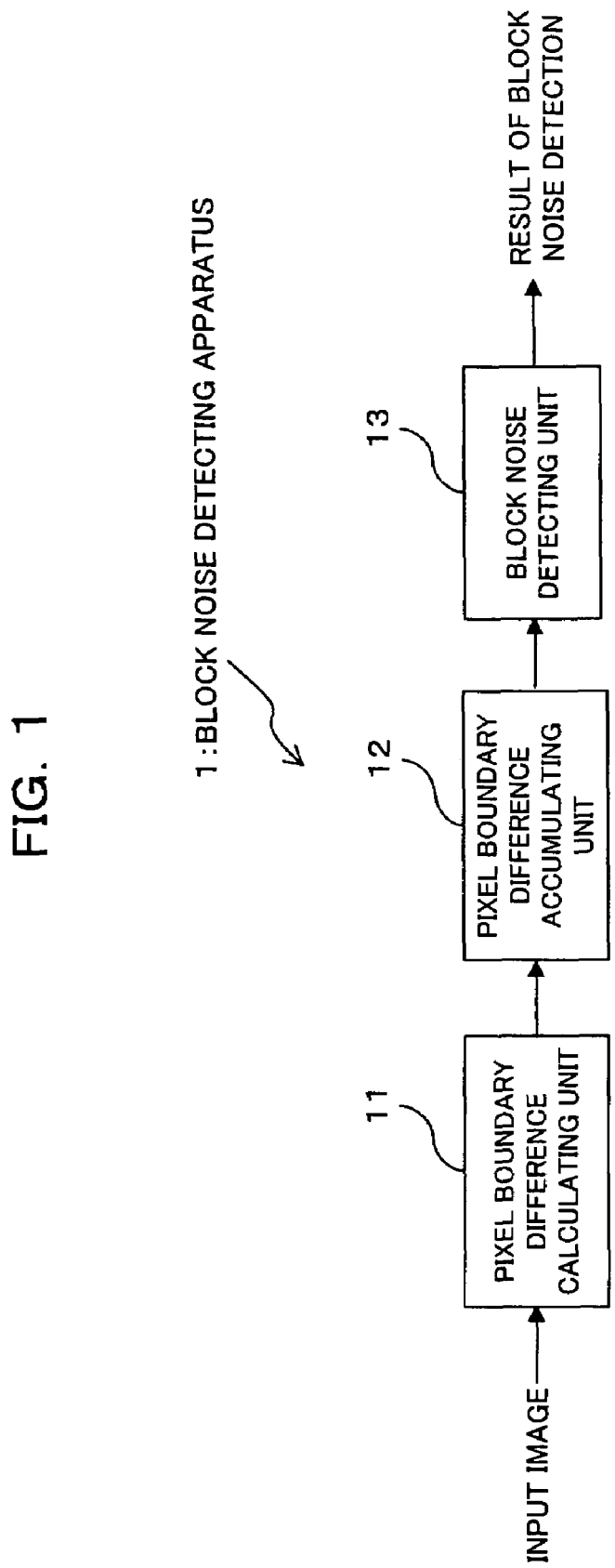
FIG. 1 is a block diagram showing a structure of a block noise detecting apparatus according to an embodiment of this invention.

FIG. 1 is a block diagram showing a structure of a block noise detecting apparatus according to an embodiment of this invention. A block noise detecting apparatus 1 shown in FIG. 1 comprises a pixel boundary difference calculating unit 11, a pixel boundary difference accumulating unit 12, and a block noise detecting unit 13.

Figure 3A:
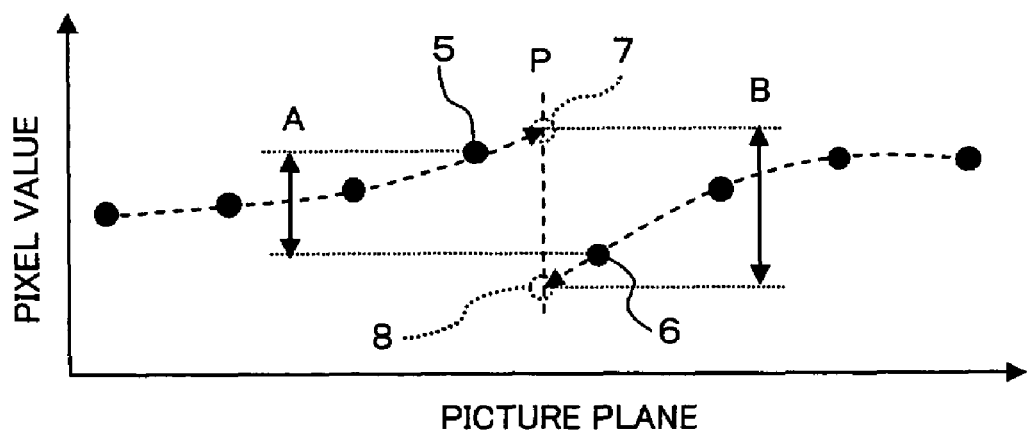
FIGS. 3(A) and 3(B) are diagrams for illustrating a first pixel boundary difference calculating method by the pixel boundary difference calculating unit shown in FIGS. 1 and 2.
Figure 3B:
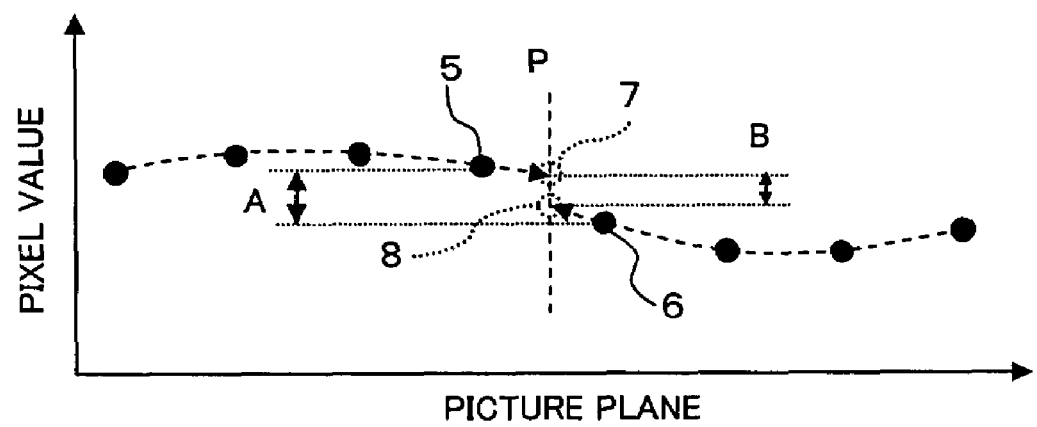

The pixel boundary difference calculating unit (pixel boundary difference detecting means) 11 calculates (detects) a difference (pixel boundary difference) between pixel values of adjacent pixels on a picture plane of input video signals. In this embodiment, as shown in FIGS. 3(A) and 3(B), the pixel boundary difference calculating unit 11 calculates a difference (absolute value) A between pixel values of adjacent pixels 5 and 6 across a certain pixel boundary P, calculates a difference (absolute value) B between a predicted pixel value (refer to reference numeral 7) on the pixel boundary predicted from plural pixels on one side (left side) of the pixel boundary P and a predicted pixel value (refer to reference numeral 8) on the pixel boundary P predicted from plural pixels on the other side (right side) of the pixel boundary, and selects and outputs a smaller value, that is, a difference absolute value A in the case of FIG. 3(A) or a difference absolute value B in the case of FIG. 3(B), as a pixel boundary difference.

In calculating a pixel boundary difference, it becomes possible to calculate a more accurate pixel boundary difference by considering a difference absolute value between the predicted pixel values 7 and 8 on the pixel boundary P even when the pixel boundary is inclined. This improves the accuracy of the block noise detection.

Figure 2:
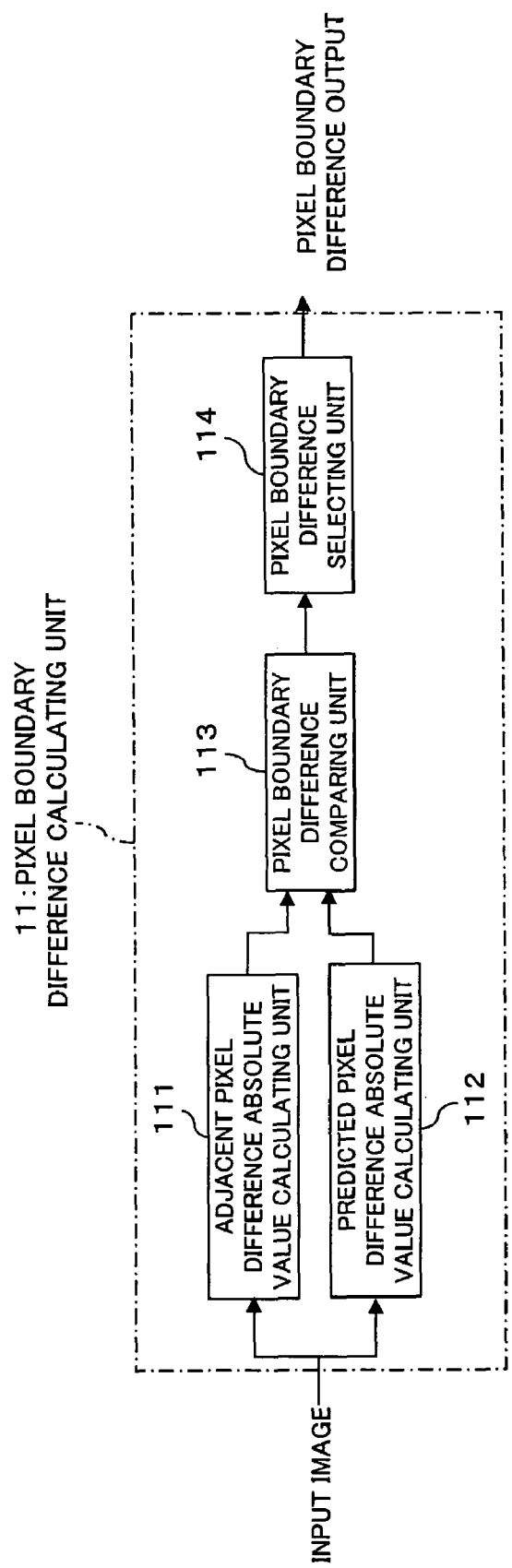
FIG. 2 is a block diagram showing a structure of a pixel boundary difference calculating unit shown in FIG. 1.

The pixel boundary difference calculating unit 11 comprises, as shown in FIG. 2, for example, at least, an adjacent pixel difference absolute value calculating unit 111 for calculating the difference absolute value A between the adjacent pixels 5 and 6 across the pixel boundary P, a predicted pixel difference absolute value calculating unit 112 for calculating the difference absolute value B between the predicted pixel values 7 and 8, and a pixel boundary difference comparing unit 113 for comparing results of calculation performed by these calculating units 111 and 112, and outputting a smaller one as the pixel boundary difference.

A pixel boundary difference selecting unit 114 sets a pixel boundary difference obtained by the pixel boundary difference comparing unit 113 to, for example, 0 when the pixel boundary difference is not less than a predetermined threshold value, thereby to prevent the pixel boundary difference from being involved in calculation of a pixel boundary accumulated value by the pixel boundary difference accumulating unit 12 in the following stage.

Figure 4A:
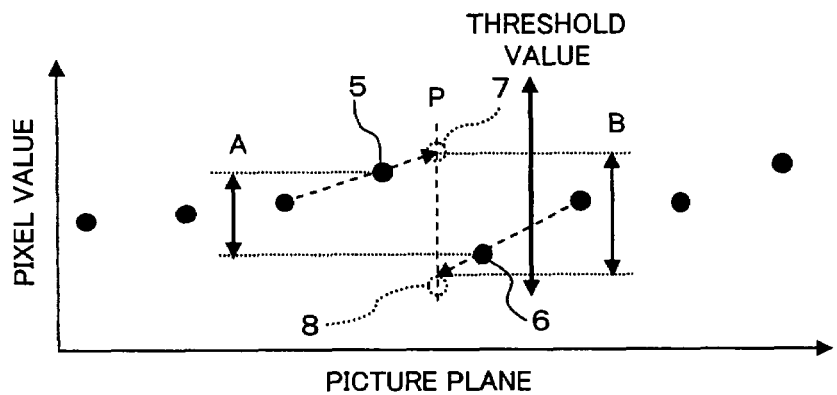
FIGS. 4(A) and 4(B) are diagrams for illustrating a pixel boundary difference to be excluded from a group of pixel boundary differences to be accumulated by a pixel boundary difference accumulating unit shown in FIG. 1.
Figure 4B:
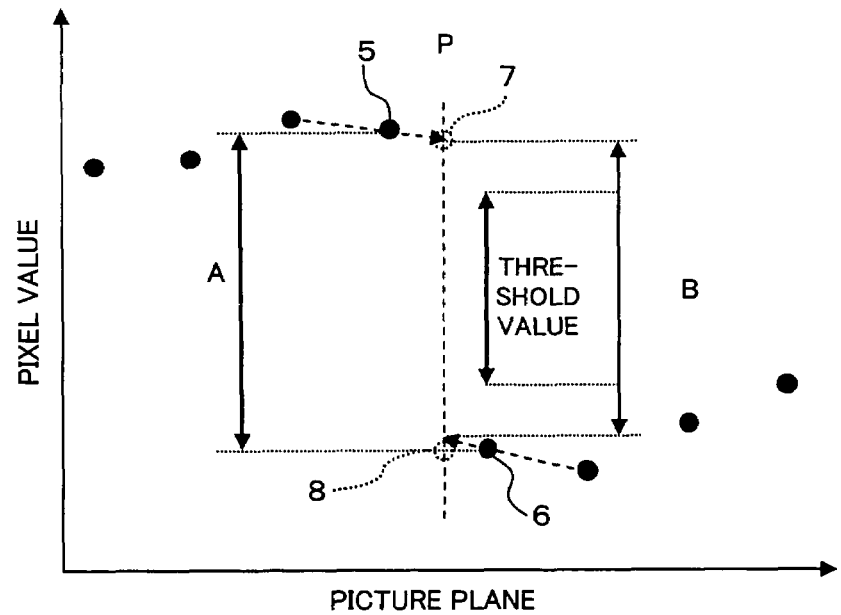

As shown in FIG. 4(A), for example, if a calculated pixel boundary difference (a smaller difference A in this case) is below the predetermined threshold value, the pixel boundary difference accumulating unit 12 adds the pixel boundary difference to a group of differences used to calculate an accumulated value for one picture frame when accumulating the pixel boundary differences across a certain pixel boundary P in cycles of the block noise size. To the contrary, as shown in FIG. 4(B), when a calculated pixel boundary difference (difference B in this case) is not less than the predetermined threshold value, the pixel boundary difference accumulating unit 12 sets the pixel boundary difference to 0 to prevent the pixel boundary difference from being involved in the accumulated value calculation.

The reason for this is as follows. Namely, when there is a difference larger than a difference that is generated due to a block noise, this difference is considered to be a difference originating from a pattern of the picture. Accordingly, the pixel boundary difference selecting unit 114 avoids a pixel boundary difference not less than the threshold value from being involved calculation of the pixel boundary difference accumulated value for block noise detection, which enables reduction of the effect of the pattern of a picture, enabling improvement of the block noise detection rate.

When the predicted pixel difference absolute value calculating unit 112 calculates a predicted pixel value, polynomial regression analysis or linear prediction may be applied, for example.

(1) In the Case of Polynomial Regression Analysis

Figure 5:
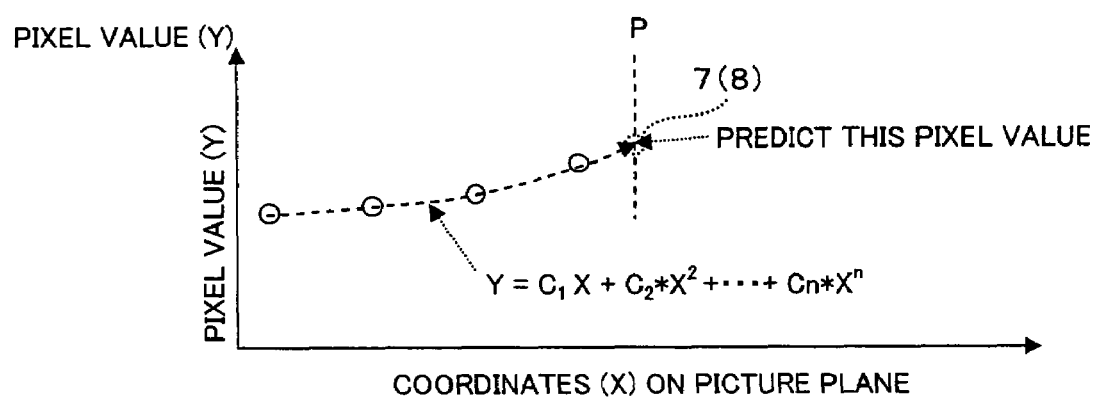
FIG. 5 is a diagram for illustrating a method of calculating a predicted pixel value by a predicted pixel difference absolute value calculating unit shown in FIG. 2.

As shown in FIG. 5, for example, coefficients $C_1, \ldots,$ and $C_n$ in a polynomial equation $Y = C_1 X + C_2 * X^2 + \ldots + C_n * X^n$ (where Y is a pixel value, and X is coordinates on a picture plane) determined from plural pixels on one side of a pixel boundary P by using polynomial regression analysis are calculated, and a predicted pixel value 7 on the pixel boundary P is calculated from the polynomial equation of the determined curve. Similarly, a predicted pixel value 8 on the pixel boundary P is calculated from plural pixels on the other side. A difference (absolute value) between the predicted pixel values 7 and 8 is outputted as a pixel boundary difference.

Figure 6:
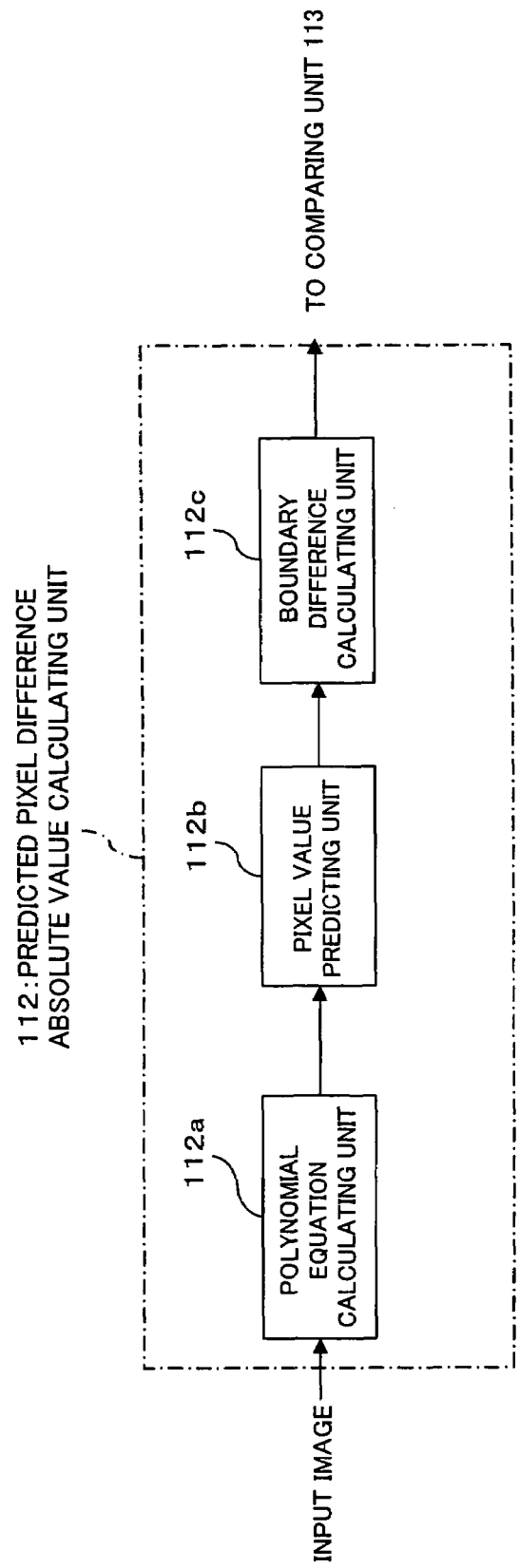
FIG. 6 is a block diagram showing a structure of the predicted pixel difference absolute value calculating unit attaining the calculating method shown in FIG. 5.

In this case, as shown in FIG. 6, for example, the predicted pixel difference absolute value calculating unit 112 may be accomplished by comprising a polynomial equation calculating unit 112a which determines polynomial equations of curves each passing as many pixels as possible on a relevant side of the pixel boundary by using polynomial regression analysis, a pixel value predicting unit 112b which calculates predicated pixel values 7 and 8 on the pixel boundary P given by the polynomial equations determined by the polynomial equation calculating unit 112a, and a boundary difference calculating unit 112c which calculates a difference (absolute value) between the predicted pixel values 7 and 8 calculated by the pixel value predicting unit 112*b* and outputs the difference as the pixel boundary difference.

(2) In the Case of Linear Prediction

Figure 7A:
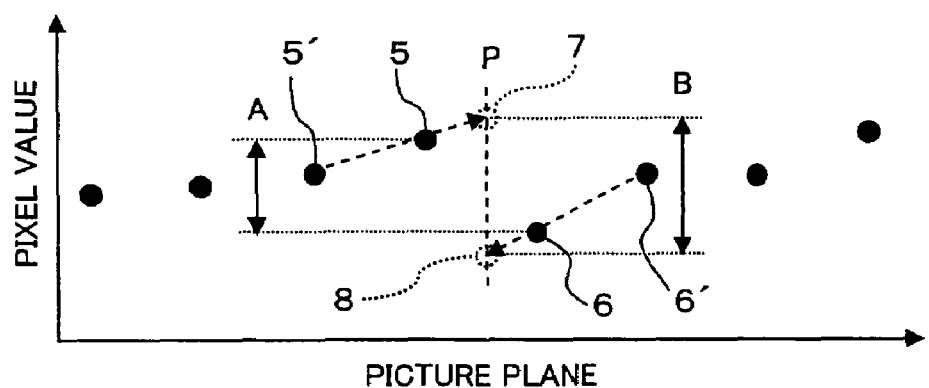
FIGS. 7(A) and 7(B) are diagrams for illustrating a second pixel boundary difference calculating method by the pixel boundary difference calculating unit shown in FIGS. 1 and 2.
Figure 7B:
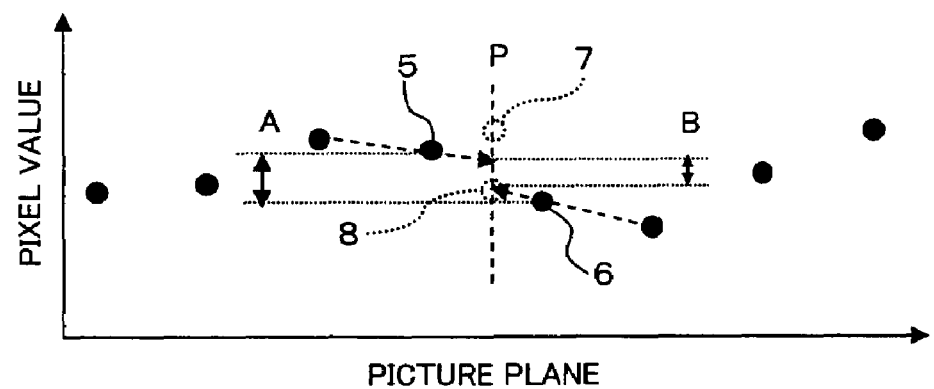

In this case, as shown in FIGS. 7(A) and 7(B), the predicted pixel difference absolute value calculating unit 112 predicts a pixel value 7 (8) on a pixel boundary P from at least two pixels 5 and 5' (6 and 6') on one side of the pixel boundary P by using linear prediction, and calculates a difference (absolute value) between the predicted values 7 and 8 determined from the both sides of the pixel boundary P. Incidentally, FIG. 7(A) depicts a case where the pixel boundary difference is a difference absolute value A (that is, a difference absolute value between the adjacent pixels 5 and 6 across the pixel boundary P), whereas FIG. 7(B) depicts a case where the pixel boundary difference is a difference absolute value B (that is, a predicted pixel difference absolute value between reference numerals 7 and 8 on the pixel boundary P).

Figure 8:
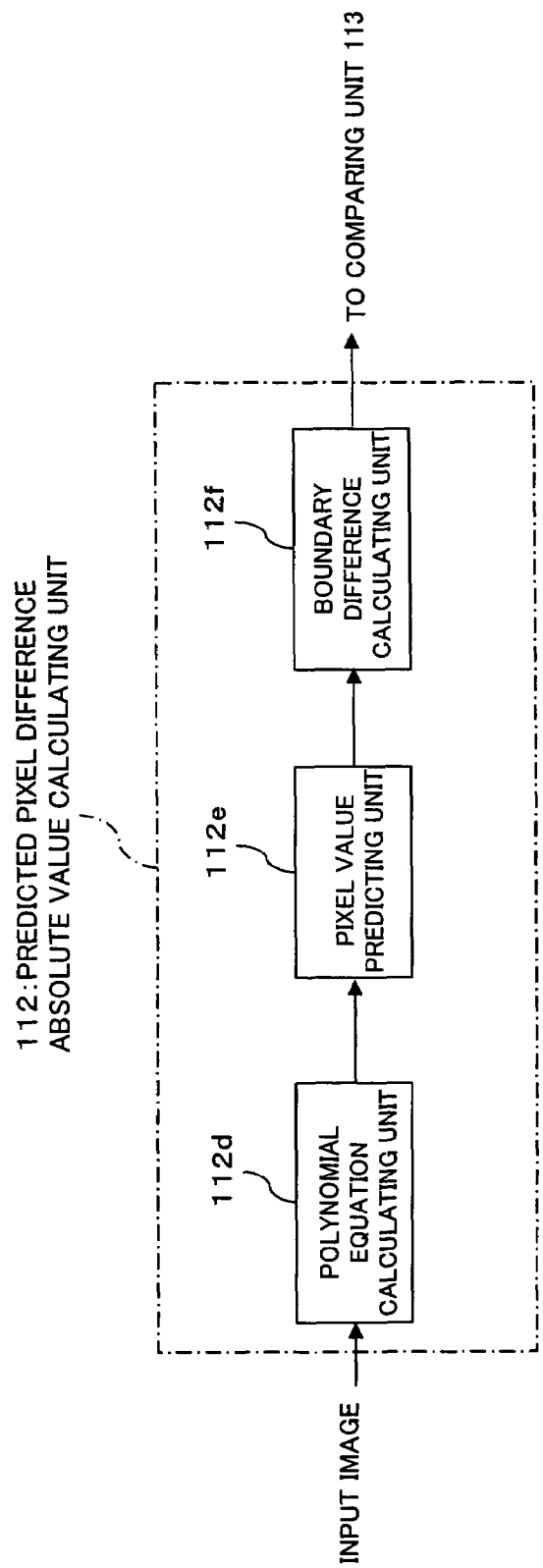
FIG. 8 is a block diagram showing a first structure of the predicted pixel difference absolute value calculating unit attaining the second pixel boundary difference calculating method.
Figure 9:
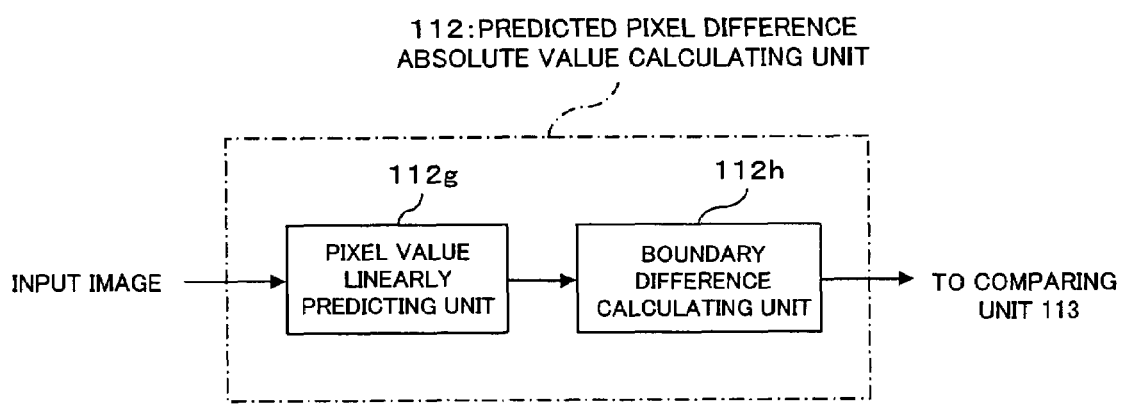
FIG. 9 is a block diagram showing a second structure of the predicted pixel difference absolute value calculating unit attaining the second pixel boundary difference calculating method.

The predicted pixel difference absolute value calculating unit 112 in this case can be accomplished as shown in FIG. 8 or 9, for example.

In the case of FIG. 8, the predicted pixel value difference absolute value calculating unit 112 may comprise like the case shown in FIGS. 5 and 6, a polynomial equation calculating unit 112*d* which determines $C_1$ and $C_2$ satisfying $C_1+C_2*X$ from two pixels 5 and 5' (6 and 6') on one side of the pixel boundary P, a pixel value predicting unit 112*e* which calculates each predicted pixel value 7 (8) on one side of the pixel boundary P from a relevant polynomial equation determined by the polynomial equation calculating unit 112, and a boundary difference calculating unit 112*f* which calculates a difference (absolute value) between the predicted pixel values 7 and 8 calculated by the pixel value predicting unit 112*e* and outputs the difference as the pixel boundary difference.

In the case of FIG. 9, the predicted pixel difference absolute value calculating unit 112 may comprise a pixel value linearly predicting unit 112*g* which determines a difference value between the two pixels 5 and 5' (6 and 6') on one side of the pixel boundary P, and adds a half of the difference value to a pixel value of either one of the two pixels 5 and 5' (6 and 6') closer to the pixel boundary P to calculate a predicted pixel value 7 (8) on the pixel boundary P, and a boundary difference calculating unit 112*h* which calculates a difference (absolute value) between the two predicted pixel values 7 and 8 calculated from the both sides of the pixel boundary P by the pixel value linearly predicting unit 112*g* and outputs the difference as the pixel boundary difference.

In the above example, a difference (absolute value) is determined from the two predicted pixel values 7 and 8 obtained from the both sides of the pixel boundary P. Alternatively, a predicted pixel value 7 (or 8) may be determined from only one side of the pixel boundary P, and a difference (absolute value) between the predicted pixel value 7 (or 8) and a pixel value of the pixel 6 (or 5) among adjacent pixels in the vicinity of the pixel boundary P on the other side of the pixel boundary P may be determined. By doing so, it is possible to improve the accuracy of the block noise detection as compared with the known techniques.

Figure 10A:
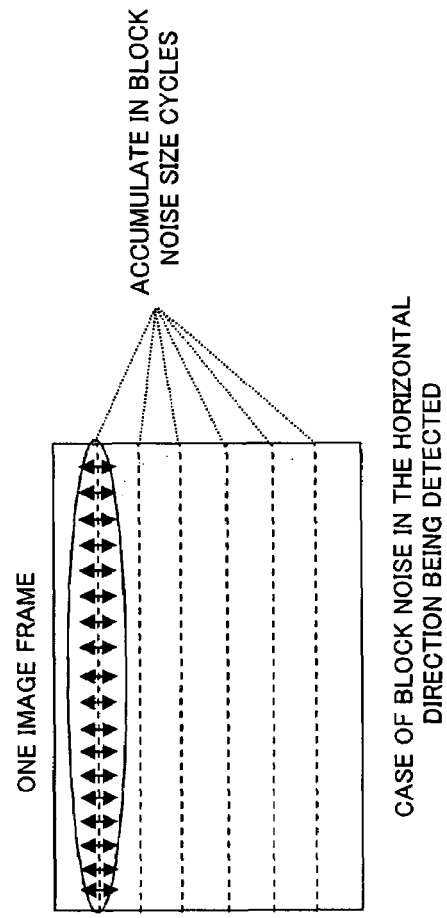
FIGS. 10(A) and 10(B) are diagrams for illustrating a pixel boundary difference accumulating method by the pixel boundary difference accumulating unit shown in FIG. 1.
Figure 10B:
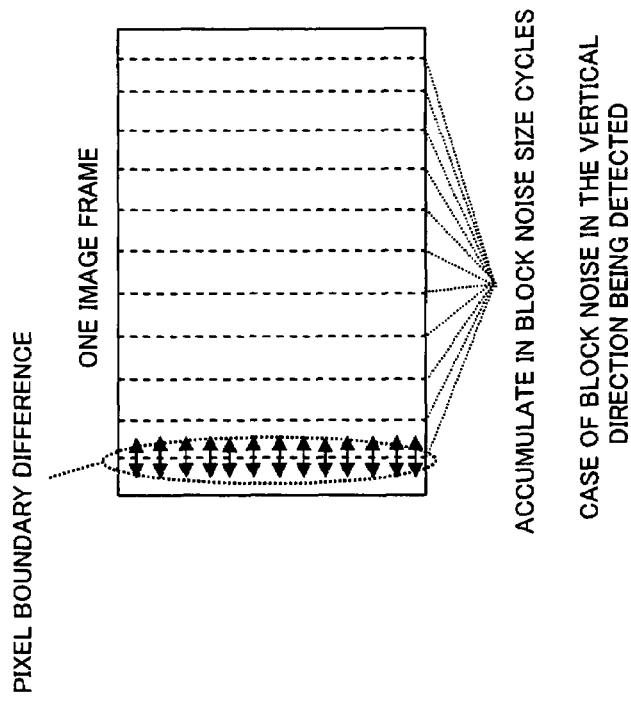

In FIG. 1, the pixel boundary difference accumulating unit (accumulating means) 12 accumulates pixel boundary differences calculated by the pixel boundary difference calculating unit 11 for one picture frame in block noise size cycles to determine an accumulating value. When detecting a block noise on an edge in the vertical direction on the picture plane, for example, the pixel boundary difference accumulating unit 12 accumulates pixel boundary differences in the horizontal direction, as shown in FIG. 10(A). When detecting a block noise on an edge in the horizontal direction on the picture plane, the pixel boundary difference accumulating unit 12 accumulates pixel boundary differences in the vertical direction, as shown in FIG. 10(B).

When a block noise of a picture enlarged by a scale factor of an integer number after the picture is decoded is detected, pixel boundary differences are accumulated in a cycle that is an integer multiple of the block noise corresponding to the scale factor, thereby calculating a pixel boundary difference with only pixels not interpolated. This also allows improvement of the accuracy of the block noise detection rate even in a picture where the block noise is enlarged.

For instance, when the picture is enlarged double, pixel boundary differences are calculated alternate pixels, whereby the effect of the interpolating process for the enlargement can be reduced, and the accuracy of the block noise detection rate is improved. Concretely, when the picture size of an SDTV picture having 720×480 pixels is reduced to a picture having 352×240 pixels or 352×480 pixels, for example, and encoded in the long-time mode of disk recorders, the picture is enlarged to have a picture size of 720×480 pixels and inputted into a TV.

Figure 11:
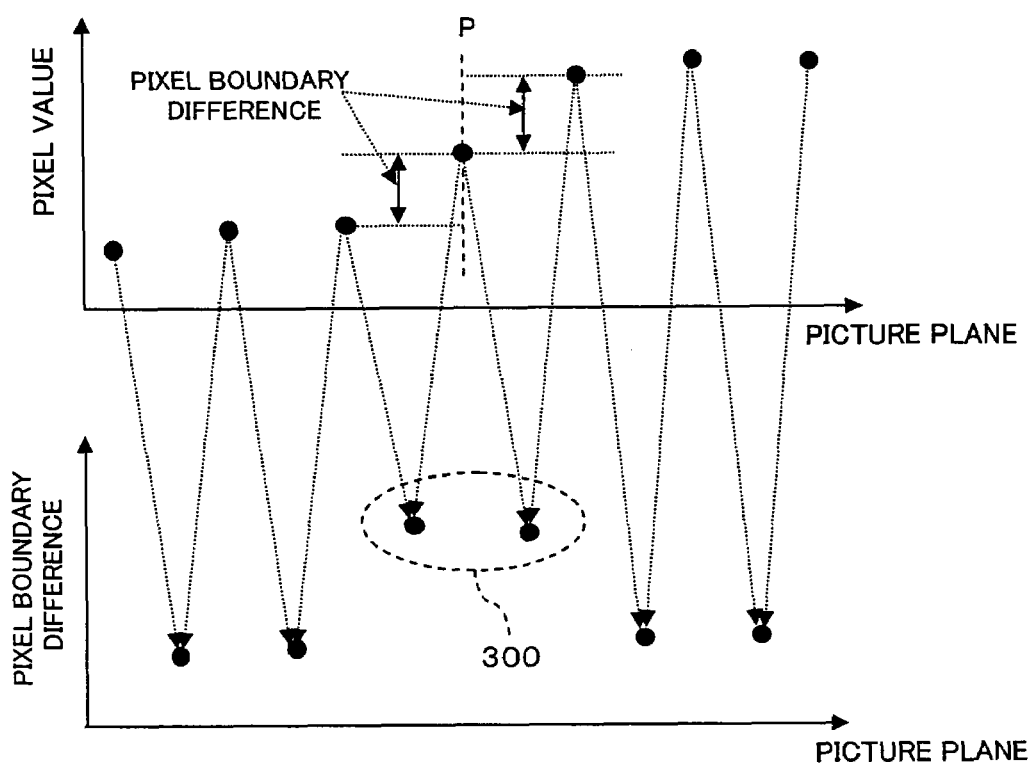
FIG. 11 is a diagram for illustrating an example of a pixel boundary difference obtained from an enlarged picture.

In such case, when a block noise is tried to be detected from a pixel boundary difference between adjacent pixels on the enlarged picture, the pixel boundary difference is divided into two almost-equal pixel boundary differences due to pixels interpolated at the time of enlargement, as shown in FIG. 11, and two peaks appear at a position of the pixel boundary difference accumulating value according to the block size (refer to a portion enclosed by a broken line 300). This makes it difficult to detect and determine a block noise, which leads to degradation of the accuracy of the detection (because it is difficult to discriminate whether the picture is free from a block noise or the picture is an enlarged picture).

Figure 12:
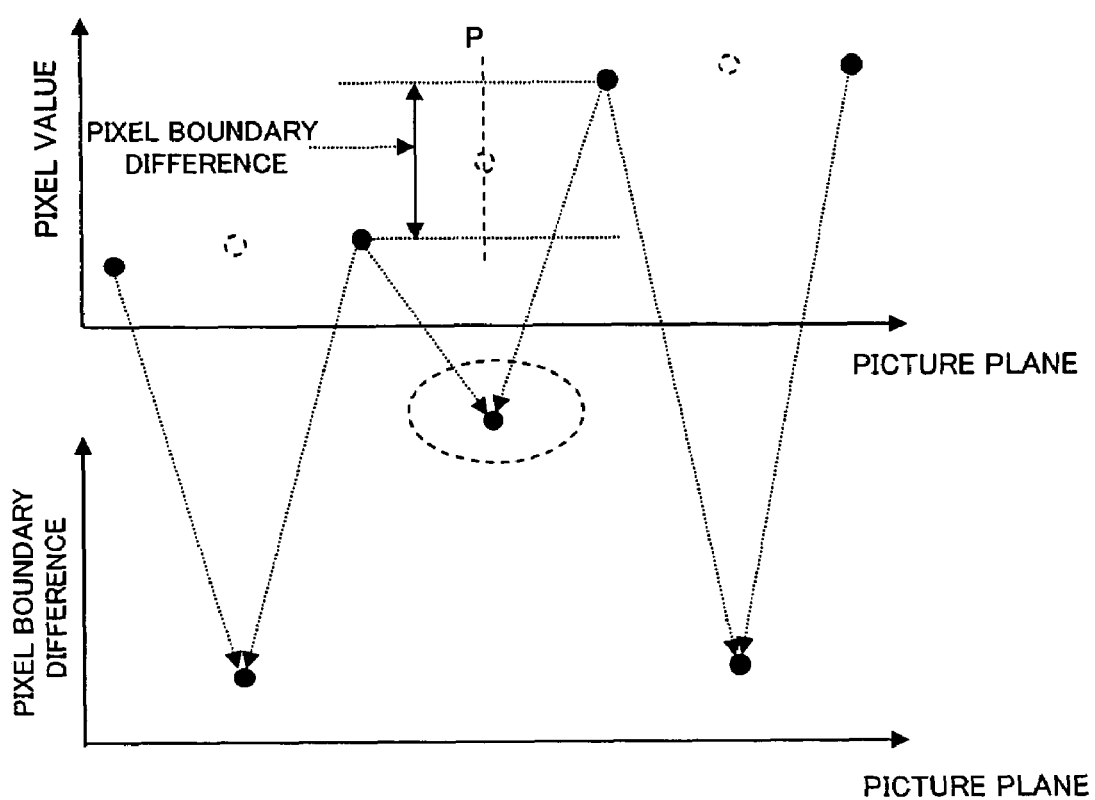
FIG. 12 is a diagram for illustrating an accumulating process (accumulating process on every two pixels) on pixel boundary differences of the enlarged picture shown in FIG. 11.
Figure 13:
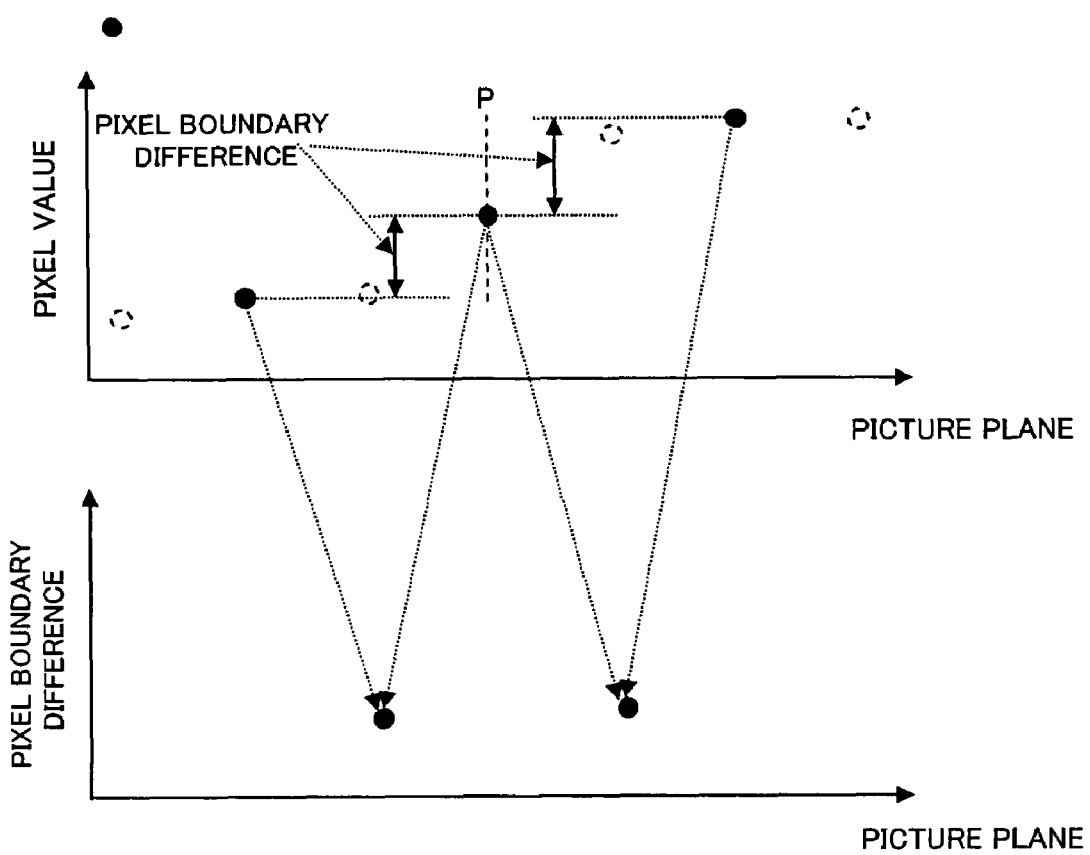
FIG. 13 is a diagram for illustrating an accumulating process (accumulating process on every two pixels) on pixel boundary differences of the enlarged picture shown in FIG. 11.

As shown in FIGS. 12 and 13, when the picture is enlarged double, a pixel boundary difference is calculated on the basis of sampling (alternate pixels in this case) according to the scale factor, thereby detecting a block noise having a single peak at the position of the pixel boundary difference. This improves the block noise detection rate of enlarged pictures. Note that here is described only a pixel boundary difference obtained by adding difference absolute values of adjacent pixels for sake of simplicity.

Figure 14:
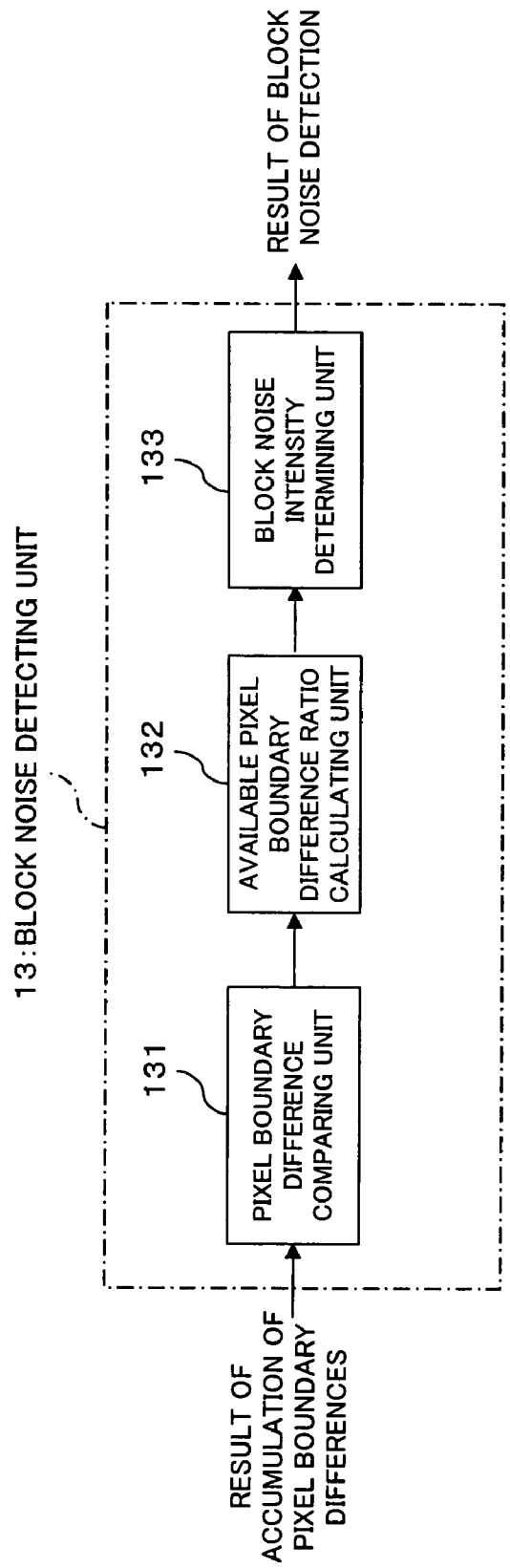
FIG. 14 is a block diagram showing a structure of a block noise detecting unit shown in FIG. 1.

In FIG. 1, the block noise detecting unit 13 calculates a block noise detection evaluation value on the basis of an accumulated value of pixel boundary differences outputted from the pixel boundary difference accumulating unit 12, and outputs information about presence or absence of block noise detection, a position of a block noise on the picture plane, and intensity of the block noise in the case where the block noise is generated, as results of the block noise detection. The block noise detecting unit 13 comprises, as shown in FIG. 14, for example, a pixel boundary difference comparing unit 131, an available pixel boundary difference ratio calculating unit 132 and a block noise intensity determining unit 133.

The pixel boundary difference comparing unit 131 outputs the largest value of pixel boundary difference accumulated values, the second largest value of the same, and a position of the largest value on the pixel boundary. The available pixel boundary difference calculating unit 132 outputs a value obtained by dividing the largest value of the pixel boundary differences by the second largest value of the same inputted from the pixel boundary difference comparing unit 131 as a block noise evaluation value, and a pixel boundary position at which the largest value is present as a block noise generating position to the block noise intensity determining unit 133.

The block noise intensity determining unit 133 compares the block noise detection evaluation value inputted from the available pixel boundary difference calculating unit 132 with a predetermined threshold value, and outputs information representing that a block noise is generated at the block noise generation position as a block noise detection result. Incidentally, the block noise intensity determining unit 133 determines that the larger the block noise detection evaluation value, the larger the intensity of the block noise is, and outputs a result of this determination.

Figure 15:
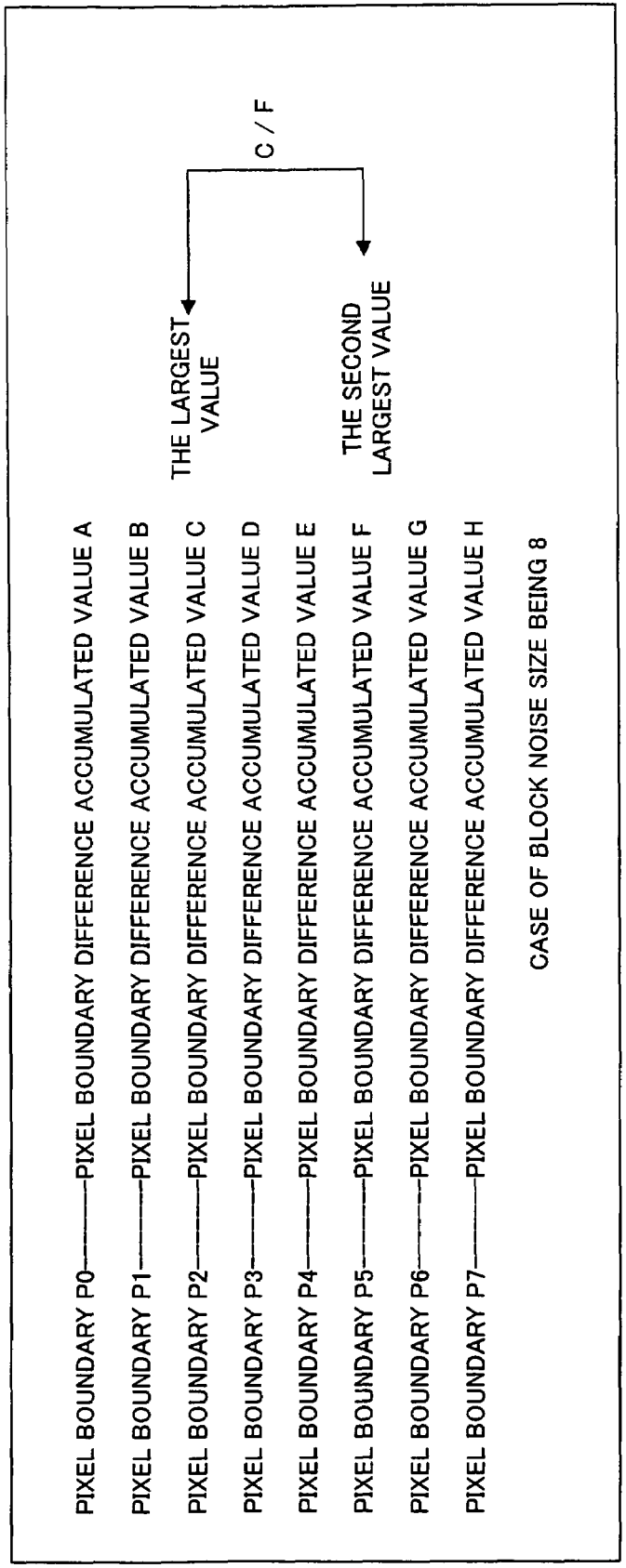
FIG. 15 is a diagram showing an example of a block noise detection evaluation value in order to explain an operation of the block noise detecting unit shown in FIG. 14.

As shown in FIG. 15, for example, assuming here that a pixel boundary difference accumulated value at "pixel boundary P0" is A, a pixel boundary difference accumulated value at "pixel boundary P1" is B, a pixel boundary difference accumulated value at "pixel boundary P2" is C, a pixel boundary difference accumulated value at "pixel boundary P3" is D, a pixel boundary difference accumulated value at "pixel boundary P4" is E, a pixel boundary difference accumulated value at "pixel boundary P5" is F, a pixel boundary difference accumulated value at "pixel boundary P6" is G, a pixel boundary difference accumulated value at "pixel boundary P7" is H, the pixel boundary difference accumulated value C at the "pixel boundary P2 " is the largest, and the pixel boundary difference accumulated value F at "pixel boundary F" is the second largest. Therefore, the block noise evaluation value is C/F, and it is determined that a block noise is generated at "pixel boundary P2" when C/F is not less than a threshold value.

The block noise detecting unit 13 determines the block noise generation intensity on the basis of a ratio of the largest value obtained by accumulating pixel boundary differences in block noise cycles for one image frame to the second largest value. Accordingly, it is possible to reduce the effect of the pattern of the picture as compared with a case where the block noise is detected on the basis of values of pixel boundary differences as will be described later with reference to FIG. 17, thereby to improve the accuracy of block noise detection.

Figure 16:
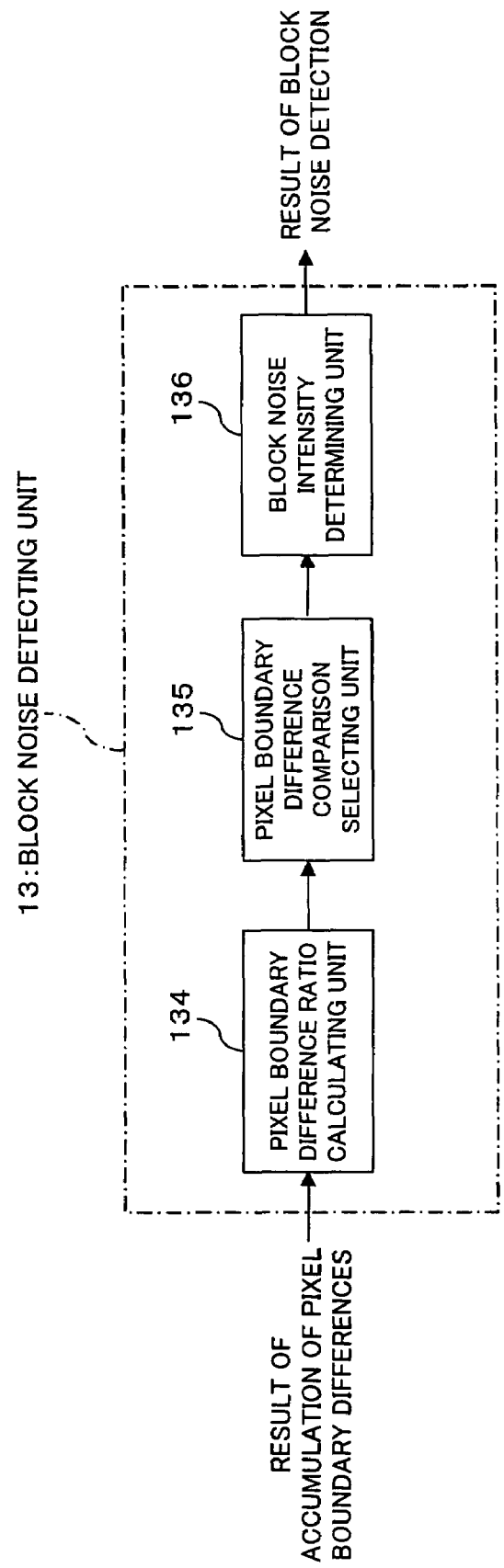
FIG. 16 is a block diagram showing a modification of the block noise detecting unit shown in FIG. 14.

Alternatively, the block noise detecting unit 13 may comprise, as shown in FIG. 16, a pixel boundary difference ratio calculating unit 134, a pixel boundary difference comparison selecting unit 135 and a block noise intensity determining unit 136.

The pixel boundary difference ratio calculating unit 134 calculates a value (that is, a ratio) by dividing a pixel boundary accumulated value at a certain pixel boundary by a pixel boundary difference accumulated value at a pixel boundary spaced by a half of the block noise size from the former pixel boundary as a block noise detection evaluation value. The pixel boundary difference comparison selecting unit 135 compares the evaluation values and selects the largest value among the evaluation values as a result of the selection, and outputs a pixel boundary at which the largest value is present as a block noise generation position.

The block noise intensity determining unit 136 compares the inputted block noise intensity evaluation value with a predetermined threshold value, and outputs information representing that a block noise is generated at this block noise generating position when the inputted block noise detection evaluation value is not less than the threshold value. Incidentally, this block noise intensity determining unit 136 determines that the larger the block noise detection evaluation value, the larger the intensity of the block noise is, and outputs a result of this determination, like the block noise intensity determining unit 133.

Figure 17:
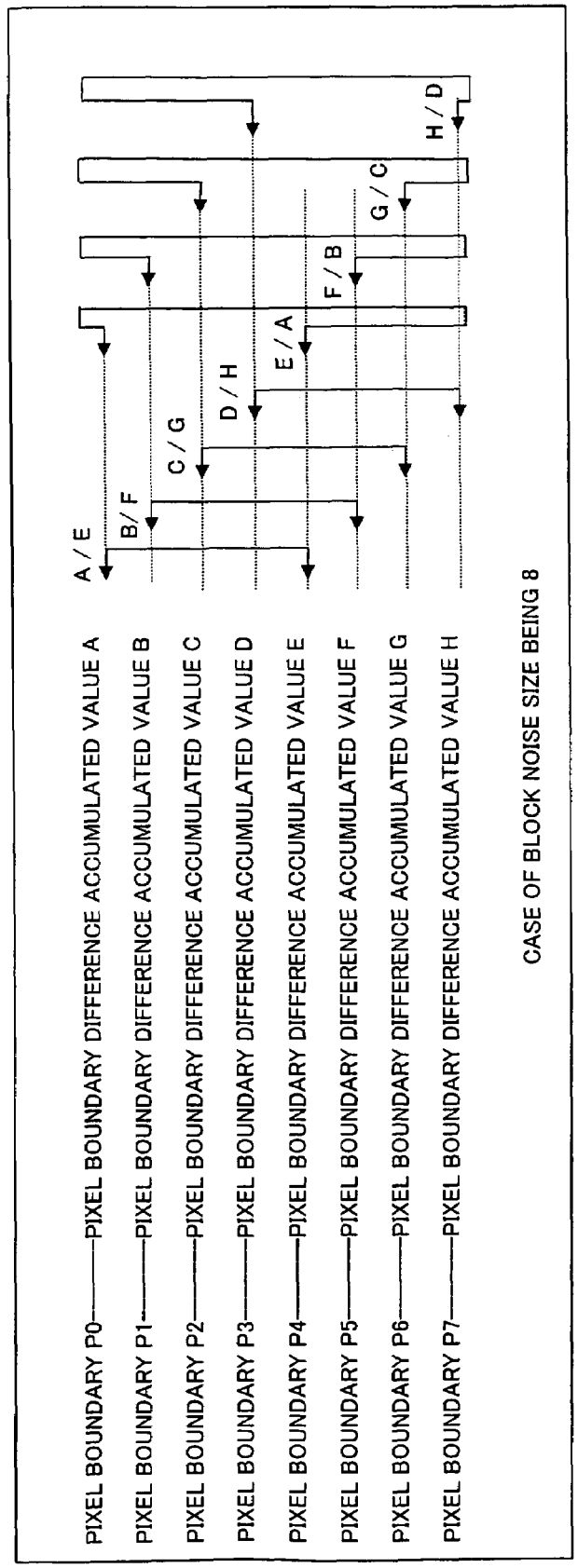
FIG. 17 is a block diagram showing an example of another operation of the block noise detecting unit shown in FIG. 16.

In this case, as shown in FIG. 17, assuming here, like the above example, that a pixel boundary difference accumulated value at "pixel boundary P0" is A, a pixel boundary difference accumulated value at "pixel boundary P1" is B, a pixel boundary difference accumulated value at "pixel boundary P2" is C, a pixel boundary difference accumulated value at "pixel boundary P3" is D, a pixel boundary difference accumulated value at "pixel boundary P4" is E, a pixel boundary difference accumulated value at "pixel boundary P5" is F, a pixel boundary difference accumulated value at "pixel boundary P6" is G, and a pixel boundary difference accumulated value at "pixel boundary P7" is H. The pixel boundary difference ratio calculating unit 134 calculates a ratio of a value obtained by accumulating pixel boundary differences across a pixel boundary for one picture frame in cycles of the block noise size to a value obtained by accumulating pixel boundary differences across a pixel boundary separated by a half of the block noise size from the former pixel boundary to obtain a block noise detection evaluation value, so that a block noise detection evaluation value at a position of "pixel boundary P0" is A/E, a block noise detection evaluation value at "pixel boundary P1" is B/F, a block noise detection evaluation value at "pixel boundary P2" is C/G, a block noise detection evaluation value at "pixel boundary position P3" is D/H, a block noise detection evaluation value at "pixel boundary P4" is E/A, a block noise detection evaluation value at "pixel boundary P5" is F/B, a block noise detection evaluation value at "pixel boundary P6" is G/C, and a block noise detection evaluation value at "pixel boundary P7" is H/D.

The pixel boundary difference comparison selecting unit 135 and the block noise intensity determining unit 136 determine that a block noise is generated on a pixel boundary having a value that is the largest of these block noise detection evaluation values and is not less than a predetermined threshold value.

As above, by comparing ratios each of which is a ratio of a value obtained by accumulating pixel boundary differences across a pixel boundary for one frame in cycles of the block noise size to a value obtained by accumulating pixel boundary differences across a pixel boundary separated by a half of the block noise size from the former pixel boundary, it becomes possible to diminish the dependency of the block noise detection value on the complexity of the picture, reduce the effect of the pattern of the picture as compared with a case where the block noise is detected on the basis of accumulated values of pixel boundary differences. This allows improvement of the accuracy of detection of a block noise.

(A1) Description of First Modification of Block Noise Detecting Apparatus

Figure 18:
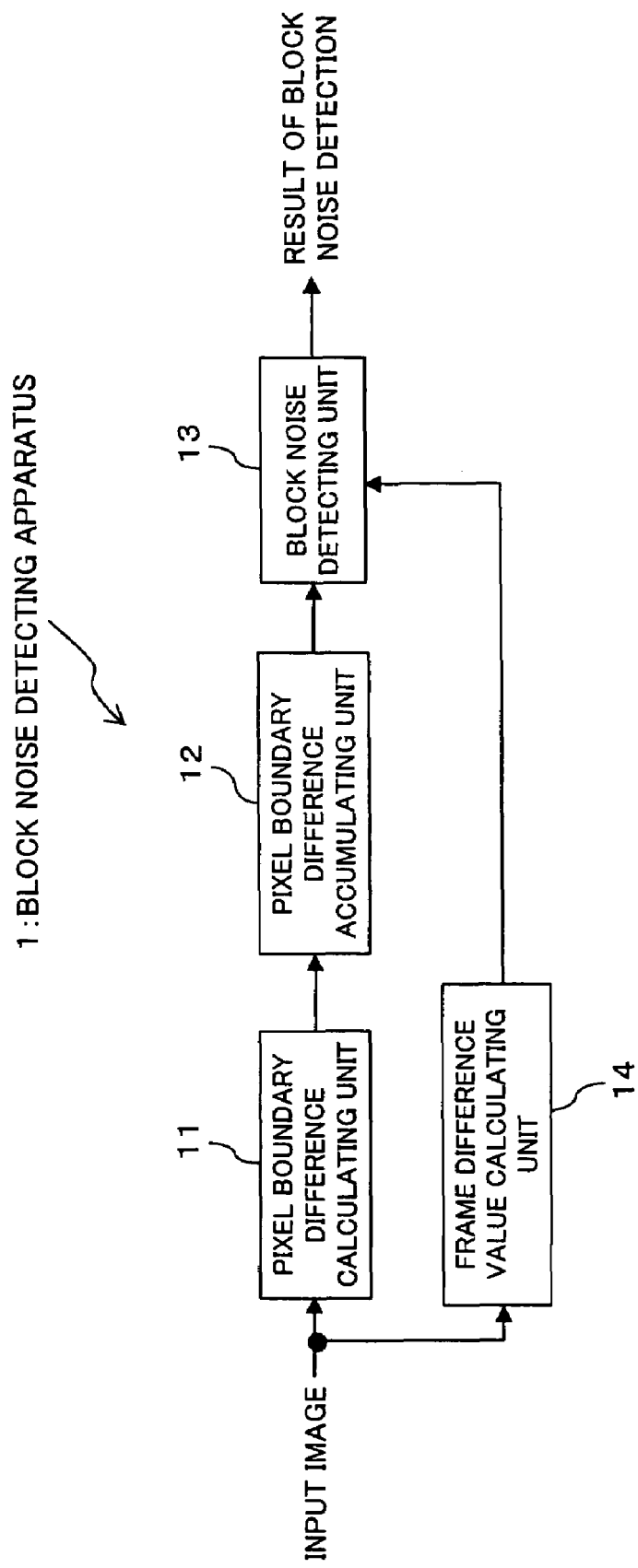
FIG. 18 is a block diagram showing a first modification of the block noise detecting apparatus shown in FIG. 1.

The block noise detecting apparatus 1 may further comprise a frame difference value calculating unit 14, as shown in FIG. 18, for example. The frame difference value calculating unit 14 calculates a difference value between a certain frame and the preceding frame during plural frames, that is, calculates a difference (absolute value) between the current frame and the preceding frame, for example. In this modification, a threshold value for block noise detection by the block noise detecting unit 13 is controlled according to a result of this calculation (a difference value between frames).

The block noise detecting unit 13 increases the threshold value (determination conditions) for block noise detection when the difference value between frames represents that correlation between the frames is large (that is, the difference value between frames is small) to make it difficult to detect a block noise, or to lower the block noise intensity according to the block noise detection evaluation value, and outputs it.

Namely, the frame difference calculating unit 14 also functions as a controlling means for controlling the determination conditions for block noise detection by the block noise detecting unit 13 to make it difficult to detect a block noise when the detected difference value between frames is smaller than a predetermined threshold value.

When the difference between frames is small, the block noise detection conditions are changed to conditions under which a block noise is difficult to be detected. Whereby, erroneous detection of a block noise, which is prone to occur when the picture is with less motion and is complicated, can be diminished even in the situation where the possibility of occurrence of a block noise is small because the difference between frames is small and the image compression ratio with motion compensation is high. This allows improvement of the accuracy of block noise detection.

(A2) Description of Second Modification of Block Noise Detecting Apparatus

Figure 19:
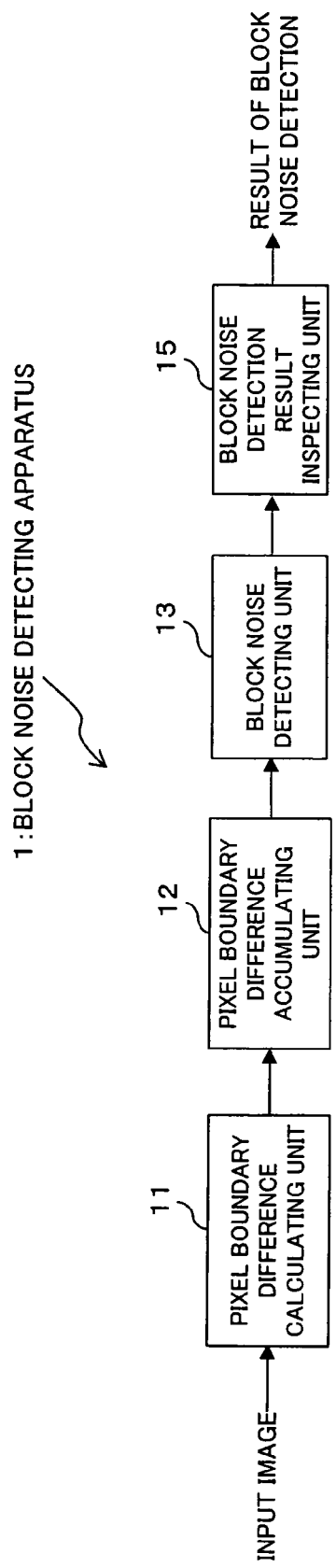
FIG. 19 is a block diagram showing a second modification of the block noise detecting apparatus shown in FIG. 1.

The block noise detecting apparatus 1 may further comprise a block noise detection result inspecting unit 15 in the following stage of the block noise detecting unit 13, as shown in FIG. 19, for example. When the same value of a detection size of a block noise and the same value of a detection position of the block noise are obtained from successive several frames, the block noise detection result inspecting unit 15 outputs a result of the detection as a result of the block noise detection.

The pixel boundary difference is prone to be affected by contents of the pattern of a picture. For this, even when a block noise in almost the same degree is generated, an accumulated value of pixel boundary differences for one frame used to determine generation of a block noise is fluctuated. Accordingly, when detecting the same block noise size and block noise position are detected from a plurality of frames, the block noise detection result inspecting unit 15 outputs these values as a result of block noise detection, whereby the effect of fluctuation in pixel boundary difference due to the pattern of a picture can be reduced and the accuracy of the block noise detection can be improved.

[B] Description of Block Noise Reducing Apparatus

Figure 20:
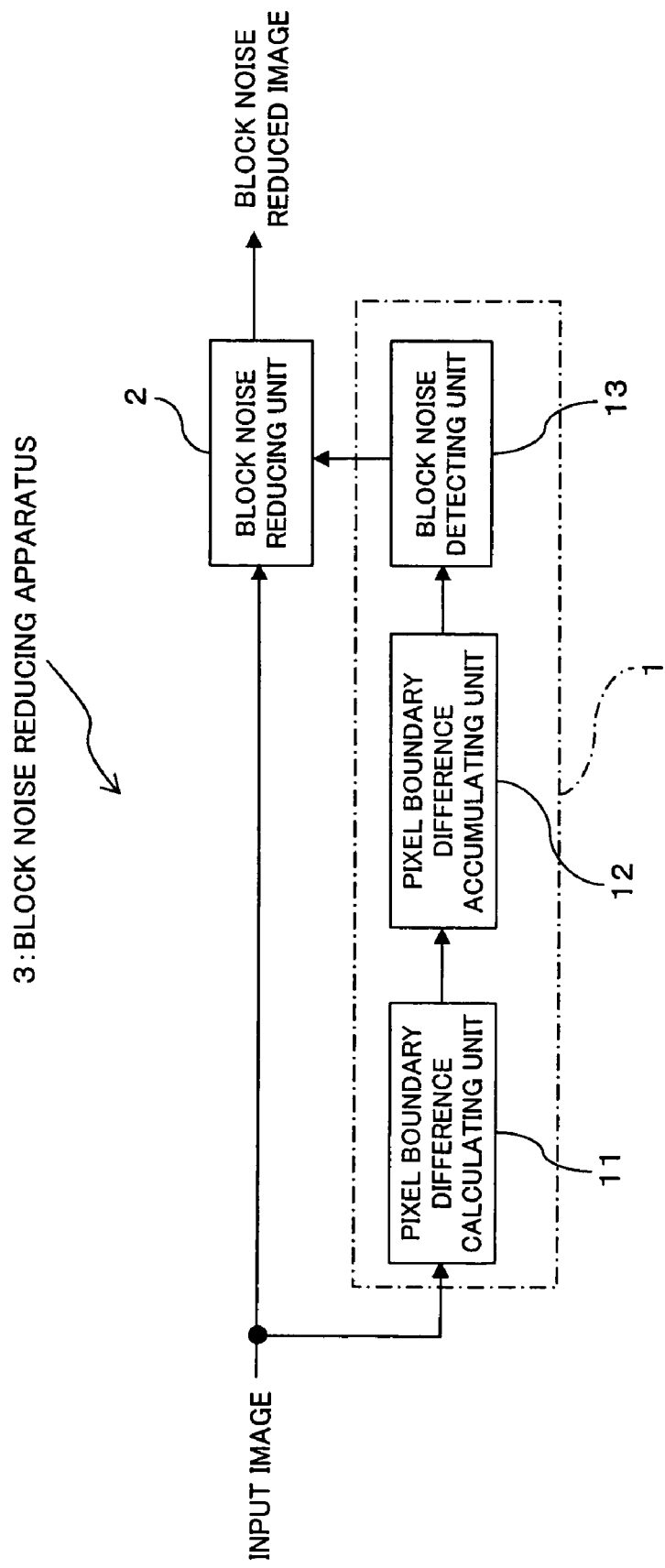
FIG. 20 is a block diagram showing essential parts of a block noise reducing apparatus according to an embodiment of this invention.

FIG. 20 is a block diagram showing a structure of essential parts of a block noise reducing apparatus according to the embodiment of this invention. A block noise reducing apparatus 3 shown in FIG. 20 comprises a block noise reducing unit 2 along with the above-described block noise detecting apparatus 1. In FIG. 20, the block noise detecting apparatus 1 has the basic structure shown in FIG. 1. However, the block noise detecting apparatus 1 may have any one of the structures of the block noise detecting apparatuses described above with reference to FIGS. 1 through 19.

Figure 21:
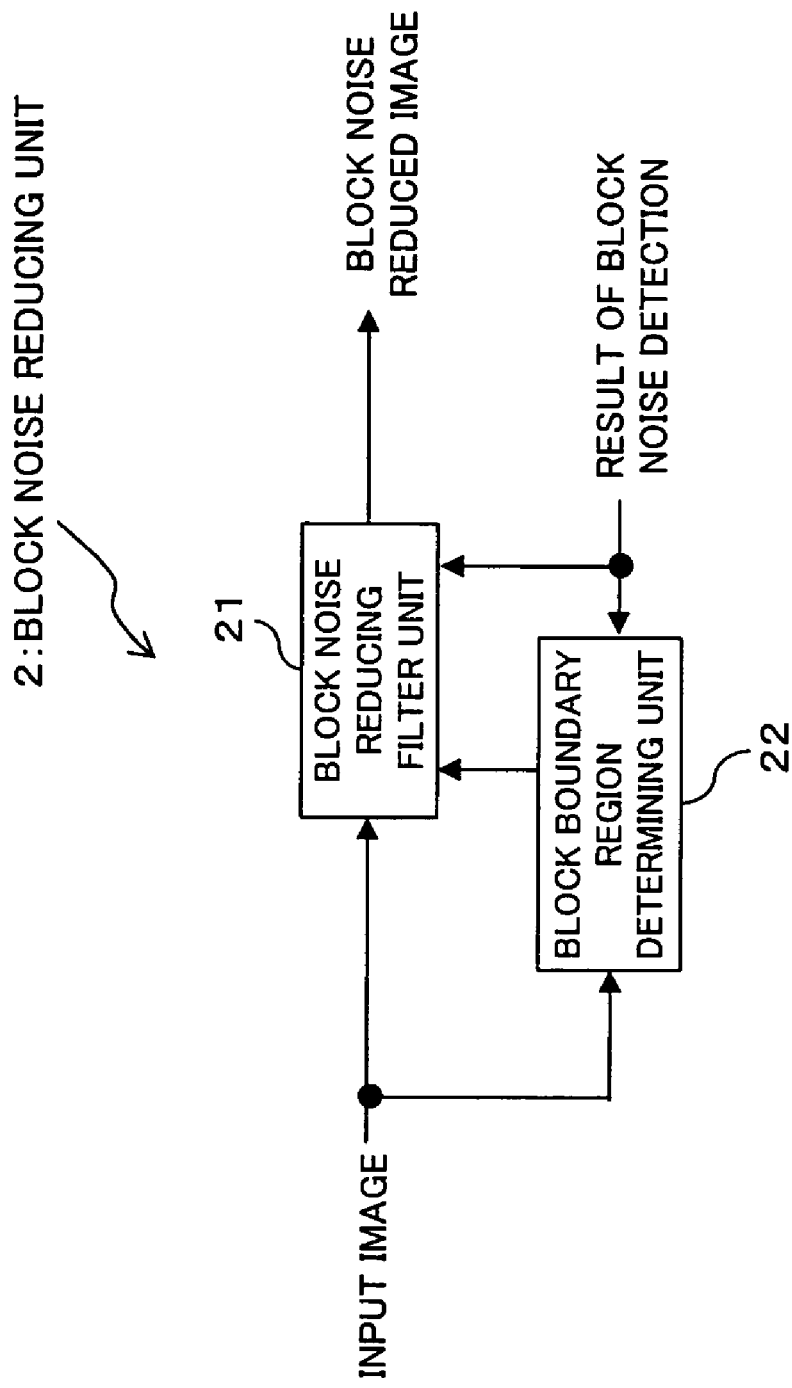
FIG. 21 is a block diagram showing a structure of the block noise reducing apparatus shown in FIG. 20.

The block noise reducing apparatus 2 removes (reduces) a block noise in input video signals on the basis of block size detection results (block noise size, block noise position, block noise intensity) obtained by the block noise detecting apparatus 1. The block noise reducing apparatus 2 comprises, as shown in FIG. 21, for example, a block noise reducing filter unit 21 and a block boundary region determining unit 22.

The block noise reducing filter unit 21 performs a block noise removing (reducing) process according to the block noise intensity detected by the block noise detecting apparatus 1. More specifically, the block noise reducing filter unit 21 applies a low-pass filtering process (block noise reducing filter) on a pixel specified by a block size and a position detected by the block noise detecting apparatus 1 in input video signals.

The block boundary region determining unit 22 determines whether or not the pixel to be filtered by the block noise reducing filter unit 21 is in a region in the vicinity of a boundary position of the block noise. The block noise reducing filter unit 21 receives a result of the determination obtained by the block boundary region determining unit 22, and reduces the block noise at a filtering intensity according to the block noise when the pixel to be filtered is at a position in the vicinity of the block noise boundary.

Namely, the block boundary region determining unit 22 fulfills a function as a filtering region controlling means for controlling to limit a region on the picture frame to which the filtering process is applied by the block noise reducing unit 2 (block noise reducing filter unit 21) to a pixel boundary on which a block noise is generated and vicinity thereof on the basis of results of detection by the block noise detecting unit 13.

The block noise reducing apparatus 3 of this example makes the block noise reducing filter act on input video signals on the basis of results of detection by the block noise detecting apparatus 1 which has excellent accuracy of block noise detection. As this, the block noise reducing filter acts only when required. Accordingly, it is possible to diminish the rate of occurrence of such phenomenon that the block noise is not reduced because the block noise reducing filter does not act although a block noise is generated, or that the picture is degraded because the block noise filter acts although a block noise is not generated, which allows improvement of the picture quality.

Generation of a block noise is caused by that high compression ratio causes loss of high frequency components, leading to loss of the continuity across a block boundary. Therefore, the block noise reducing filter 21 reduces such block noise, but causes degradation of the picture quality at the same time such that the picture gets blurred.

For this, the block noise reducing apparatus 3 performs the filtering process on only pixels in the vicinity of block boundaries on the basis of a result of determination by the block boundary region determining unit 22 to suppress degradation of the picture in regions other than the neighborhoods of block boundaries, while diminishing the discontinuity across the block boundary which is a cause of a block noise. This allows improvement of the picture quality after the block noise reducing process.

Figure 23:
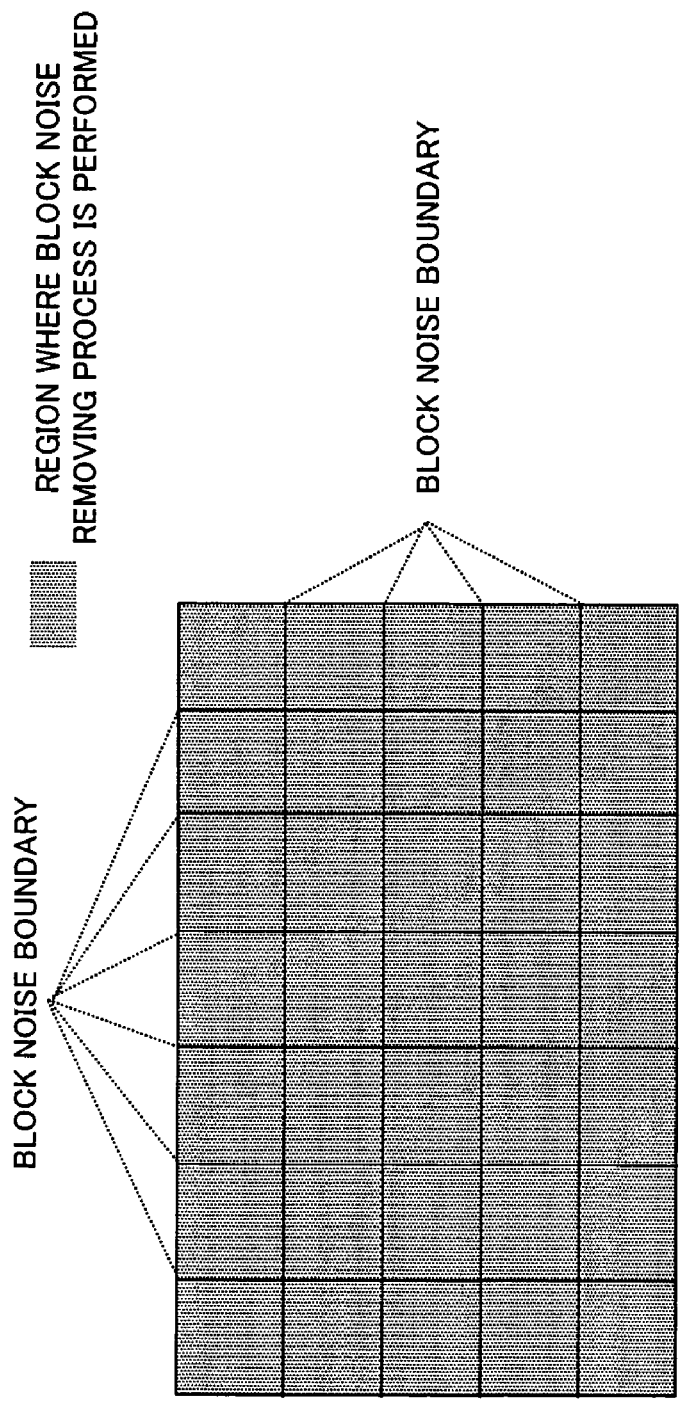
FIG. 23 is a diagram showing an example where a block noise removing process is performed on the entire picture.
Figure 24:
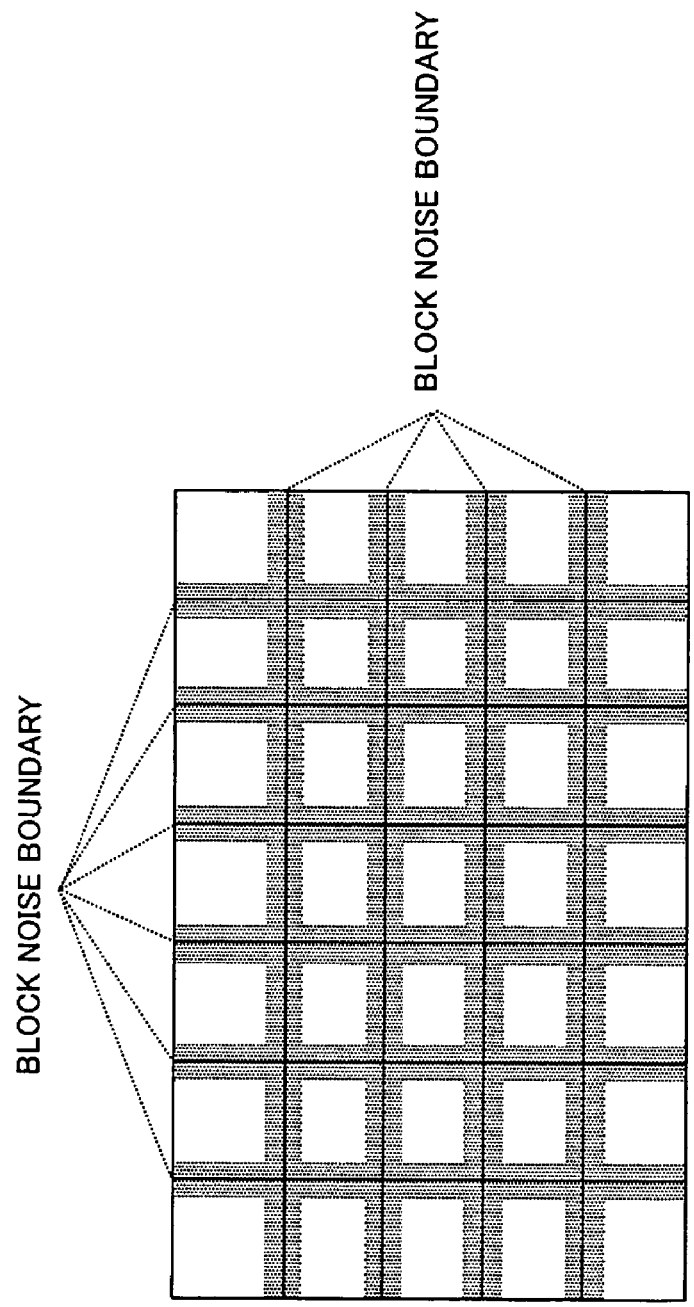
FIG. 24 is a diagram for illustrating a block noise removing process by the block noise reducing unit shown in FIGS. 21 and 22.
Figure 25:
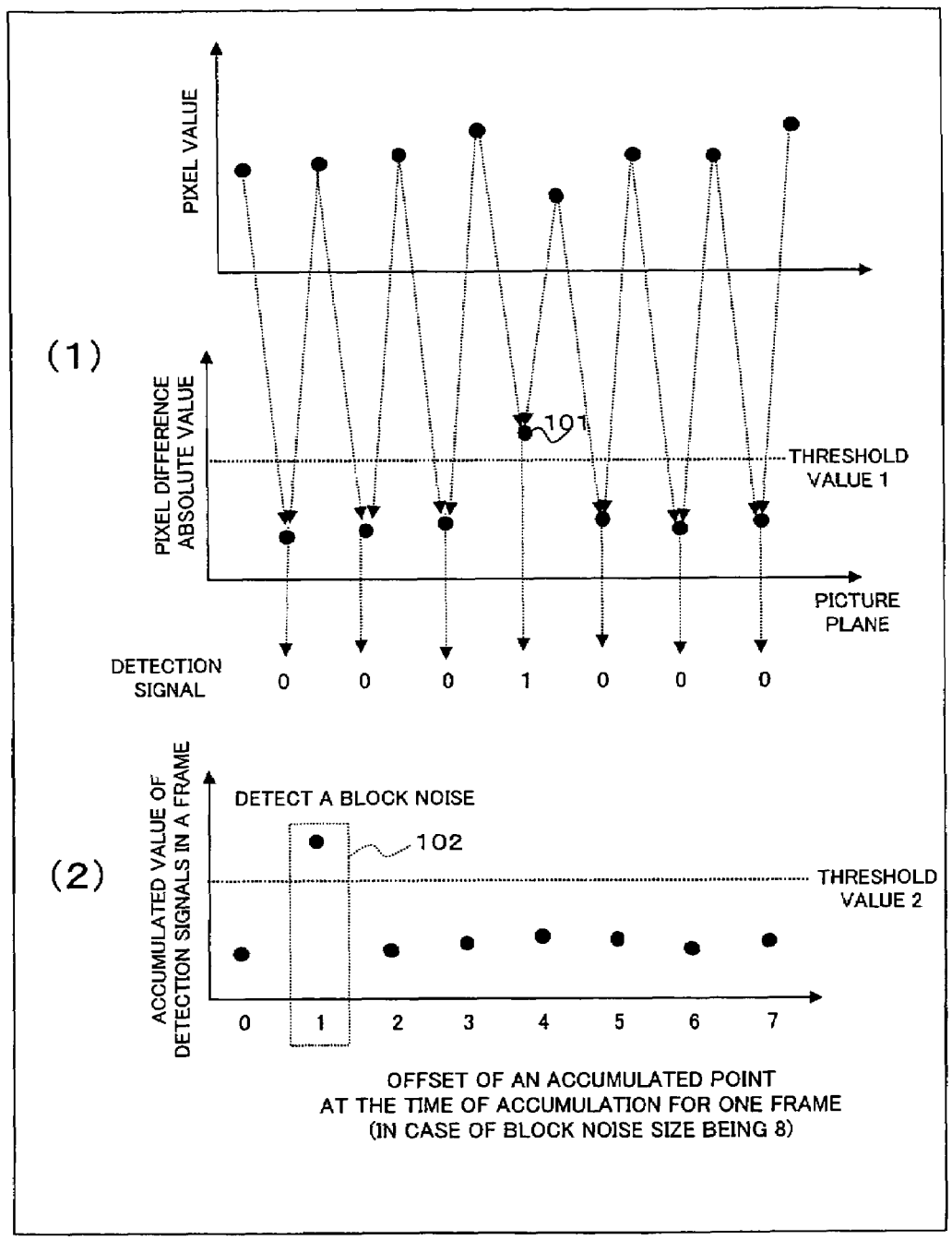
FIG. 25 is a diagram for illustrating a known block noise detecting method.
Figure 26:
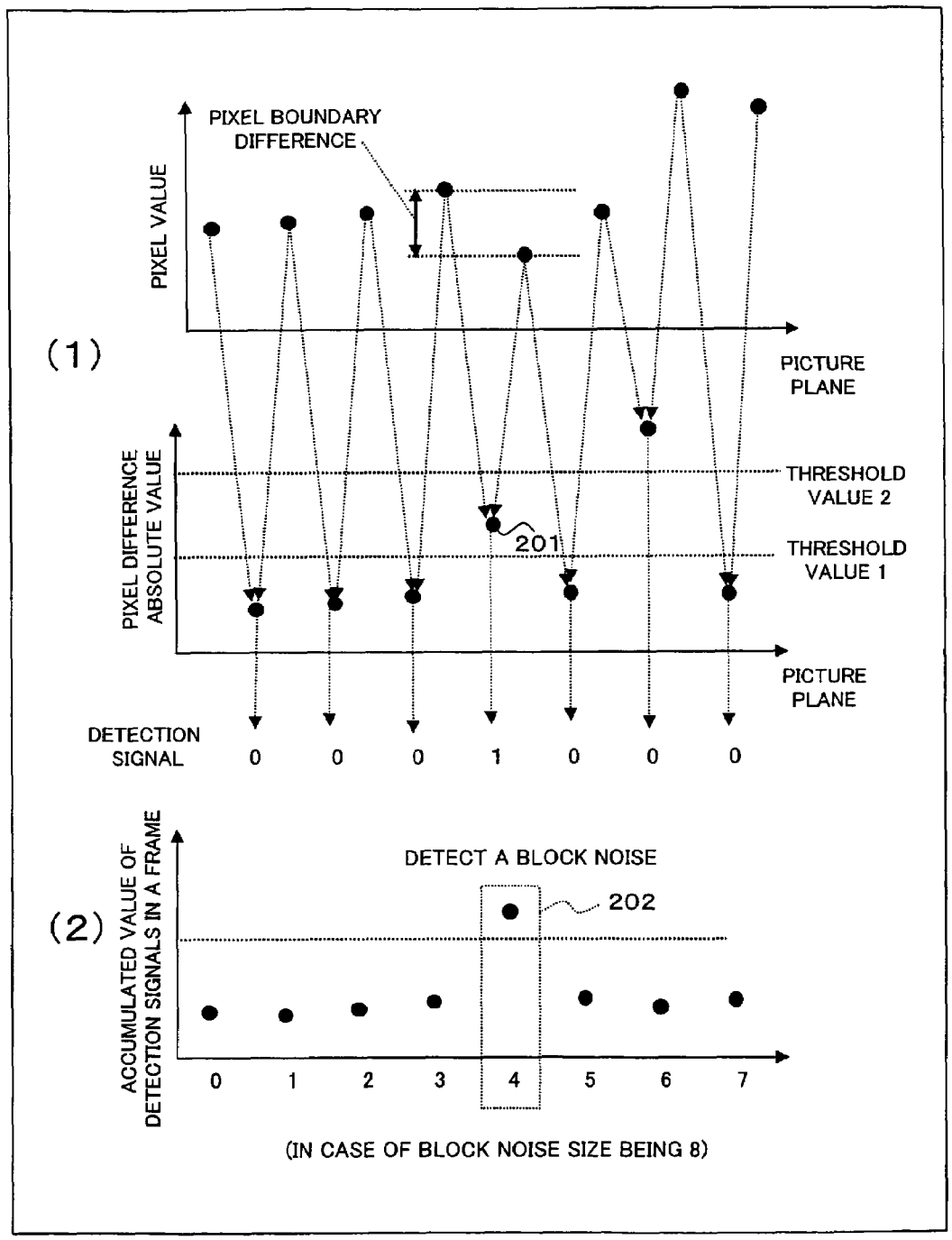
FIG. 26 is a diagram for illustrating another known block noise detecting method.

Namely, the filtering process is performed on not the entire picture as shown in FIG. 23 but only pixels in the vicinity of block noise boundaries as shown in FIG. 24, thereby diminishing a block noise while suppressing blur of the pattern of a picture.

When the block noise detecting unit 13 of the block noise detecting apparatus 1 has the structure described above with reference to FIGS. 14 and 15, the filtering intensity of the block noise reducing unit 2 (block noise reducing filter unit 21) is controlled according to a ratio of the largest value of accumulated values each obtained by accumulating pixel boundary differences for one frame in block size cycles to the second largest value of the same in the block noise reducing apparatus 3. Accordingly, it is possible to make the block noise reducing filter unit 21 act at a filtering intensity according to the block noise detection intensity, which allows improvement of the picture quality after the block noise reducing process.

When the block noise detecting unit 13 of the block noise detecting apparatus 1 has the structure described above with reference to FIGS. 16 and 17, the filtering intensity in the block noise reducing unit 2 (block noise reducing filter unit 21) in the block noise reducing apparatus 3 is controlled according to a ratio of an accumulated value obtained by accumulating pixel boundary differences across a pixel boundary for one frame in block noise cycles to an accumulated value obtained by accumulating pixel boundary differences across a pixel boundary separated by a half of the block noise size from the former pixel boundary. In this case, it is possible to make the block noise reducing filtering unit 21 act at a filtering intensity according to the block noise detection intensity, which allows improvement of the picture quality after the block noise reducing process, as well.

In the above case, the block noise detecting unit 13 also fulfills a function as a filter controlling means for controlling the filtering intensity by the block noise reducing unit 2 (block noise reducing filter unit 21) on the basis of a ratio of the largest value of accumulated values of pixel boundary differences to the second largest value of the same, or a ratio of an accumulated value of pixel boundary differences across a pixel boundary to an accumulated value across a pixel boundary separated by a half of the block noise size from the former pixel boundary.

(B1) Description of Modification of Block Noise Reducing Apparatus (Block Noise Reducing Unit 2)

Figure 22:
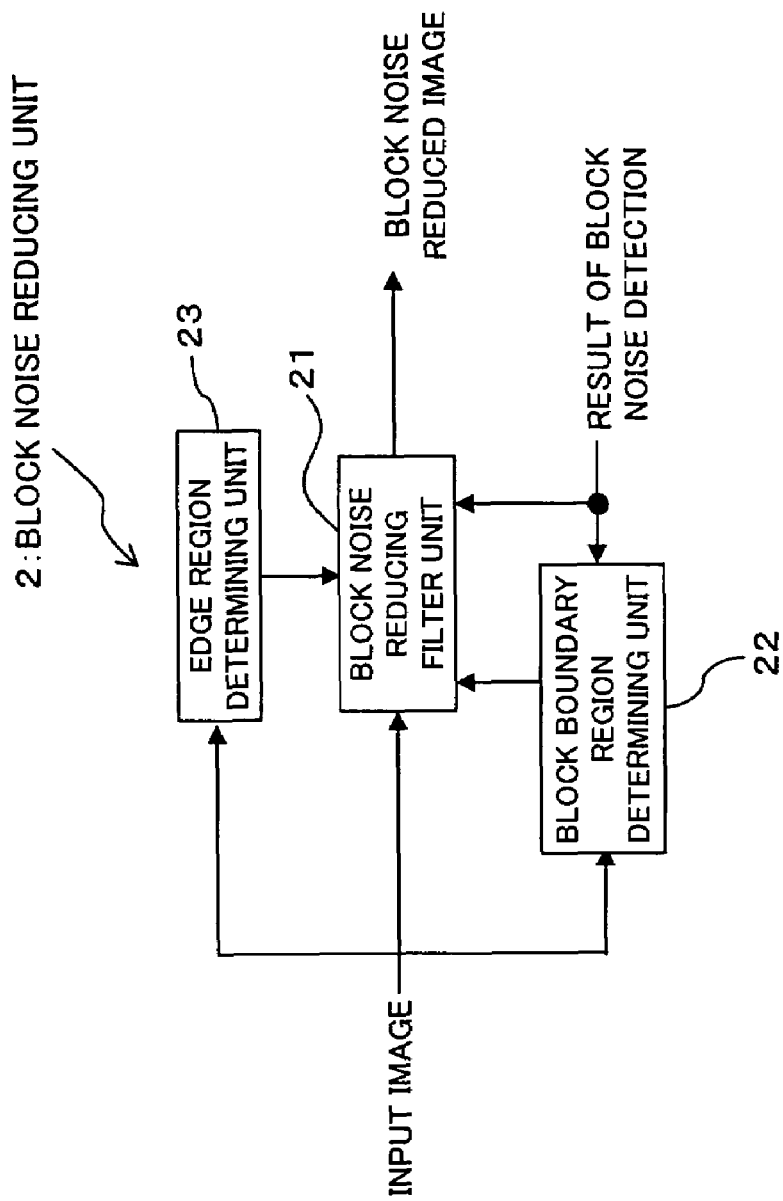
FIG. 22 is a block diagram showing a modification of the block noise reducing apparatus shown in FIG. 21.

The block noise reducing unit 2 of the block noise detecting apparatus 3 may further comprise an edge region determining unit 23 along with the block noise reducing filter unit 21 and the block boundary region determining unit 22 described above, as shown in FIG. 22, for example.

The edge region determining unit 23 detects, with an edge detecting filter or the like, whether or not a pixel to be filtered by the block noise reducing filter unit 21 is in the edge region, and outputs a result of this detection to the block noise reducing filter unit 21. The block noise reducing filter unit 21 receives a result of the determination by the block boundary region determining unit 22 and a result of the determination by the edge region determining unit 23, and makes the block noise reducing filter unit 21 perform the filtering process on the input video signals when the pixel to be filtered is in the vicinity of the block noise boundary and not in the edge region. When not, the block noise reducing filter unit 21 prevents the filtering process from being performed.

Namely, the edge region determining unit 23 fulfills a function as a filter interruption controlling unit for controlling to interrupt the filtering process by the block noise reducing unit 2 (block noise reducing filter unit 21) when the pixel boundary difference value is not less than a predetermined threshold value.

Whereby, it is possible to avoid degradation of the picture quality because the filtering process by the block noise reducing filter unit 21 is performed on a pixel boundary difference originated from the nature of a picture, which allows improvement of the picture quality after the block noise reducing process.

Note that the present invention is not limited to the above examples, but may be modified in various ways without departing from the spirit and scope of the invention.

According to the present invention, consideration is given to a predicted pixel value on a pixel boundary when a pixel boundary difference is calculated, as described above. Thus, even when the pixel boundary is inclined, it is possible to detect a more accurate pixel boundary difference, and improve the accuracy of block noise detection without using decoding information in compression coding such as quantization scale or the like. This is useful to effectively reduce a block noise, and improve the picture quality. Therefore, this invention is very useful in the technical field of digital image compression coding.

What is claimed is:

1. A block noise detecting method comprising:
    detecting a pixel boundary difference across a pixel boundary on the basis of a difference value between pixel values of adjacent pixels across the pixel boundary on a picture plane of an input image frame, and a predicted pixel value on the pixel boundary predicted from at least a plurality of pixels on one side of the pixel boundary; and
    accumulating the pixel boundary differences for one image frame to detect a block noise,
    wherein the difference value between pixel values of the adjacent pixels is compared with a difference value between the predicted pixel value on the pixel boundary predicted from the plural pixels on one side of the pixel boundary and the predicted pixel value on the pixel boundary predicted from a plurality of pixels on the other side of the pixel boundary, and a smaller difference value is detected as a pixel boundary difference across the pixel border.

2. The block noise detecting method according to claim 1, wherein the pixel boundary differences are accumulated in a cycle of a block noise size.

3. The block noise detecting method according to claim 1, wherein the predicted pixel value on the pixel boundary is calculated from at least two pixels on one side of the pixel border.

4. The block noise detecting method according to claim 1, wherein when the pixel boundary difference is larger than a predetermined threshold value, the pixel border difference is excluded from a group of pixel boundary differences to be accumulated.

5. The block noise detecting method according to claim 1, wherein ratios each of which is a ratio of an accumulated value obtained by accumulating pixel boundary differences across a pixel boundary for one image frame to an accumulated value obtained by accumulating pixel boundary differences across a pixel boundary separated by a half of a block noise size from the former pixel boundary are compared with one another to determine a block noise generation intensity.

6. The block noise detecting method according to claim 1, wherein a block noise generation intensity is determined on the basis of a ratio of the largest value of accumulated values each of which is obtained by accumulating pixel boundary differences across a pixel boundary for one image frame to the second largest value of the accumulated values.

7. The block noise detecting method according to claim 1, wherein a difference between at least two image frames including the input image frame is determined, and determination conditions of block noise detection is controlled such that the block noise is difficult to be detected when a value of the difference is smaller than a predetermined threshold value.

8. The block noise detecting method according to claim 1, wherein when the block noise is detected on an image enlarged by a scaling factor of an integer multiple after the image is decoded, pixel boundary differences are accumulated in a cycle corresponding to the integer multiple of a block noise size.

9. The block noise detecting method according to claim 1, wherein when the same value is obtained as a result of detection of the block noise from successive plural image frames, this result of the detection is outputted.

10. A block noise detecting apparatus comprising:
    pixel boundary difference detecting means for detecting a pixel boundary difference across a pixel boundary on the basis of a difference value between pixel values of adjacent pixels across the pixel boundary on a picture plane of an input image frame, and a predicted pixel value on the pixel boundary predicted from at least a plurality of pixels on one side of the pixel boundary;

accumulating means for accumulating the pixel boundary differences for one image frame; and block noise detecting means for detecting a block noise on the basis of a result of accumulation by said accumulating means, wherein the difference value between pixel values of the adjacent pixels is compared with a difference value between the predicted pixel value on the pixel boundary predicted from the plural pixels on one side of the pixel boundary and the predicted pixel value on the pixel boundary predicted from a plurality of pixels on the other side of the pixel boundary, and a smaller difference value is detected as a pixel boundary difference across the pixel border.

11. The block noise detecting apparatus according to claim 10, wherein said pixel boundary difference detecting means comprises:

an adjacent pixel difference value calculating unit for determining the difference value between pixel values of the adjacent pixels;

a predicted pixel difference value calculating unit for determining a difference value between the predicted pixel value on the pixel boundary predicted from a plurality of pixels on one side of the pixel boundary and the predicted value on the pixel boundary predicted from a plurality of pixels on the other side of the pixel boundary; and a comparing unit for comparing results of calculation by the calculating units, and detecting a smaller difference value as a pixel boundary difference across the pixel boundary.

12. The block noise detecting apparatus according to claim 10, wherein said accumulating means accumulates the pixel boundary differences in a cycle of a block noise size.

13. The block noise detecting apparatus according to claim 10, wherein said predicted pixel difference value calculating unit calculates the predicted pixel value on the pixel boundary from at least two pixels on one side of the pixel boundary.

14. The block noise detecting apparatus according to claim 10, wherein when the pixel boundary difference is larger than a predetermined threshold value, said pixel boundary difference detecting means or said accumulating means excludes the pixel boundary difference from a group of pixel boundary differences to be accumulated.

15. The block noise detecting apparatus according to claim 10, wherein said block noise detecting means comprises:

means for comparing, with one another, ratios each of which is a ratio of an accumulated value obtained by accumulating pixel border differences across a pixel border for one image frame by said accumulating means to an accumulated value obtained by accumulating pixel border differences across a pixel border separated by a half of a block noise size from the former pixel boundary to determine a block noise generation intensity.

16. The block noise detecting apparatus according to claim 10, wherein said block noise detecting means comprises:

means for determining a block noise generation intensity on the basis of a ratio of the largest value of accumulated values each of which is obtained by accumulating pixel border differences across a pixel boundary for one image frame by said accumulating means with the second largest value of the accumulated values.

17. The block noise detecting apparatus according to claim 10, further comprising:

frame difference detecting means for determining a difference between at least two image frames including the input image frame; and controlling means for, when a value of the difference detected by said frame difference detecting means is smaller than a predetermined threshold value, controlling determination conditions of block noise detection by said block noise detecting means such that the block noise is difficult to be detected.

18. The block noise detecting apparatus according to claim 10, wherein when the block noise is detected on an image enlarged by a scaling factor of an integer multiple after the image is decoded, said accumulating means accumulates the pixel border differences in a cycle corresponding to the integer multiple of a block noise size.

19. The block noise detecting apparatus according to claim 10, further comprising:

block noise detection result inspecting means for, when the same value is obtained as a result of detection by said block noise detecting means from successive plural image frames, outputting this result of the detection.

20. A block noise reducing method comprising:

detecting a pixel boundary difference across a pixel boundary on the basis of a difference value between pixel values of adjacent pixels across the pixel boundary on a picture plane of an input image frame, and a predicted pixel value on the pixel boundary predicted from at least a plurality of pixels on one side of the pixel boundary;

accumulating the pixel boundary differences for one image frame to detect a block noise; and performing a block noise reducing process on the input image frame on the basis of the detected block noise, wherein the difference value between pixel values of the adjacent pixels is compared with a difference value between the predicted pixel value on the pixel boundary predicted from the plural pixels on one side of the pixel boundary and the predicted pixel value on the pixel boundary predicted from a plurality of pixels on the other side of the pixel boundary, and a smaller difference value is detected as a pixel boundary difference across the pixel border.

21. The block noise reducing method according to claim 20, wherein a filtering intensity of a filtering process as being the block noise reducing process is controlled on the basis of ratios each of which is a ratio of an accumulated value obtained by accumulating pixel border differences across a pixel boundary for one image frame to an accumulated value obtained by accumulating pixel border differences across a pixel boundary separated by a half of a block noise size from the former pixel boundary.

22. The block noise reducing method according to claim 20, wherein a filtering intensity of a filtering process as being the block noise reducing process is controlled on the basis of a ratio of the largest value of accumulated values each of which is obtained by accumulating pixel boundary differences across a pixel boundary for one image frame to the second largest value of the accumulated values.

23. The block noise reducing method according to claim 20, wherein a region on the picture plane to which the block noise reducing process is applied is limited to a pixel boundary and vicinity thereof where a block noise is generated on the basis of the result of block noise detection.

24. The block noise reducing method according to claim 20, wherein when the pixel boundary difference is equal to or larger than a threshold value, the block noise reducing process is not performed.

25. A block noise reducing apparatus comprising:

pixel boundary difference detecting means for detecting a pixel boundary difference across a pixel boundary on the basis of a difference value between pixel values of adjacent pixels across the pixel boundary on a picture plane of an input image frame, and a predicted pixel value on the pixel boundary predicted from at least a plurality of pixels on one side of the pixel boundary;

accumulating means far accumulating the pixel boundary differences for one image frame;

block noise detecting means for detecting a block noise on the basis of a result of accumulation by said accumulating means; and block noise reducing means for performing a block noise reducing process on the input picture frame on the basis of the block noise detected by said block noise detecting means, wherein the difference value between pixel values of the adjacent pixels is compared with a difference value between the predicted pixel value on the pixel boundary predicted from the plural pixels on one side of the pixel boundary and the predicted pixel value on the pixel boundary predicted from a plurality of pixels on the other side of the pixel boundary, and a smaller difference value is detected as a pixel boundary difference across the pixel border.

26. The block noise reducing apparatus according to claim 25, further comprising:

filter controlling means for controlling a filtering intensity of a filtering process as being the block noise reducing process by said block noise reducing means on the basis of ratios each of which is a ratio of an accumulated value obtained by accumulating pixel boundary differences across a pixel boundary for one image frame by said accumulating means to an accumulated value obtained by accumulating pixel boundary differences across a pixel boundary separated a half of a block noise size from the former pixel boundary.

27. The block noise reducing apparatus according to claim 25, further comprising:

filter controlling means for controlling a filtering intensity of a filtering process as being the block noise reducing process by said block noise reducing means on the basis of a ratio of the largest value of accumulated values each of which is obtained by accumulating pixel boundary differences across a pixel boundary for one image frame by said accumulating means to the second largest value of the accumulated values.

28. The block noise reducing apparatus according to claim 25, further comprising:

filtering region controlling means for limiting a region on the picture plane to which the filtering process is applied by said block noise reducing means to a pixel boundary and vicinity thereof where a block noise is generated on the basis of a result of detection by said block noise detecting means.

29. The block noise reducing apparatus according to claim 25, further comprising:

filter interruption controlling means for controlling to interrupt the filtering process by said block noise reducing means when the pixel boundary difference is equal to or larger than a threshold value.

* * * * *

UNITED STATES PATENT AND TRADEMARK OFFICE
CERTIFICATE OF CORRECTION

| | |
|---|---|
| PATENT NO. | : 7,668,392 B2 |
| APPLICATION NO. | : 11/496501 |
| DATED | : February 23, 2010 |
| INVENTOR(S) | : Kohji Yamada et al. |

Page 1 of 1

It is certified that error appears in the above-identified patent and that said Letters Patent is hereby corrected as shown below:

Column 19, Line 5, change "far" to --for--.

Signed and Sealed this

Eleventh Day of May, 2010

David J. Kappos
*Director of the United States Patent and Trademark Office*